(12) United States Patent
Moulin et al.

(10) Patent No.: US 11,999,564 B2
(45) Date of Patent: Jun. 4, 2024

(54) METHOD FOR SECURING A CLIMBING ROUTE

(71) Applicant: EXOTEC, Croix (FR)

(72) Inventors: Romain Moulin, Lille (FR); Loïc Lepillier, Wasquehal (FR)

(73) Assignee: EXOTEC, Croix (FR)

( * ) Notice: Subject to any disclaimer, the term of this patent is extended or adjusted under 35 U.S.C. 154(b) by 28 days.

(21) Appl. No.: 17/779,855

(22) PCT Filed: Nov. 16, 2020

(86) PCT No.: PCT/EP2020/082296
§ 371 (c)(1),
(2) Date: May 25, 2022

(87) PCT Pub. No.: WO2021/104922
PCT Pub. Date: Jun. 3, 2021

(65) Prior Publication Data
US 2023/0002155 A1    Jan. 5, 2023

(30) Foreign Application Priority Data

Nov. 26, 2019   (FR) ...................................... 1913256

(51) Int. Cl.
*B65G 1/04*     (2006.01)
*B65G 1/14*     (2006.01)

(52) U.S. Cl.
CPC ......... *B65G 1/0435* (2013.01); *B65G 1/0492* (2013.01); *B65G 1/14* (2013.01)

(58) Field of Classification Search
CPC ............................ B65G 1/0492; B65G 1/0435
See application file for complete search history.

(56) References Cited

U.S. PATENT DOCUMENTS

| 10,822,169 B2* | 11/2020 | Moulin | ................ B65G 1/065 |
| 2017/0121110 A1* | 5/2017 | Zombori | .............. B65G 1/1375 |
| 2020/0122923 A1* | 4/2020 | Moulin | ................ B65G 1/0435 |
| 2022/0281683 A1* | 9/2022 | Huang | ...................... B65G 1/06 |
| 2022/0388775 A1* | 12/2022 | Baulard | ............... B65G 1/0492 |

FOREIGN PATENT DOCUMENTS

| JP | 63-242809 A | 10/1988 |
| JP | 6-115625 A | 4/1994 |
| JP | 6-42810 U | 6/1994 |
| WO | 2018/189110 A1 | 10/2018 |

OTHER PUBLICATIONS

International Search Report for PCT/EP2020/082296, dated Feb. 4, 2021.

* cited by examiner

*Primary Examiner* — Kaitlin S Joerger
(74) *Attorney, Agent, or Firm* — Sughrue Mion, PLLC

(57) ABSTRACT

Method for securing a first and a second upright, including the following steps of a) attaching the connectors and b) adjusting the position of the first upright and the position of the second upright such that the first lower end of a first climbing element and the second lower end of second climbing element lie in a plane substantially orthogonal to a climbing direction.

17 Claims, 15 Drawing Sheets

XIV - XIV

XXIII - XXIII

METHOD FOR SECURING A CLIMBING ROUTE

CROSS REFERENCE TO RELATED APPLICATIONS

This application is a National Stage of International Application No. PCT/EP2020/082296 filed Nov. 16, 2020, claiming priority based on French Patent Application No. 1913256 filed Nov. 26, 2019.

FIELD OF THE INVENTION

The invention relates to the field of product storage, and more specifically, storage devices integrated with an automated product storage and recovery system.

BACKGROUND OF THE INVENTION

A storage unit conventionally comprises several substantially parallelepiped-shaped racks. Such a rack comprises four vertical uprights connected together by horizontal cross-members which support shelves. The shelves define the lower portion of storage compartments. Generally, a storage compartment is a parallelepiped volume corresponding to that of a standard pallet and a forklift can access the storage compartment via a main face to deposit the palett when it is necessary to remove one of the products which is stored thereon for the preparation of an order.

The racks are generally arranged such that the main faces of the storage compartments face one another. The racks thus arranged delimit a main circulation span of the forklift which extends between two circulation avenues which distribute other spans.

The handling carriages and the space which is necessary for them to manoeuvre, obligate the circulation spans and avenues to be widely sized, which reduces the floor surface area on which storage racks can be mounted. Finally, the storage height is limited to the maximum handling height of the forklift which, when it increases, increases the wheelbase of the forklift and obligates the circulation spans and avenues to also be extended.

OBJECT OF THE INVENTION

The object of the invention is to improve the storage and/or packing capacity of a storage unit occupying a defined floor surface area.

SUMMARY OF THE INVENTION

To this end, a method is provided for securing a first and a second upright parallel to one another, and respectively provided with a first climbing element and a second climbing element. The method comprises the following steps; the first upright being in a first mounting position:
a) attaching a first lower connector to a first lower portion of the first upright;
b) attaching a first upper connector to a first upper portion of the first upright;
c) attaching a first lower end of the first climbing element to the first lower connector and a first upper end of the first climbing element to the first upper connector;
d) adjusting a first distance separating the first lower end and the first upper end of the first climbing element to bring the first distance to a first predetermined value;
e) immobilising the position of the first lower end and the position of the first upper end of the first climbing element relative to the first upright;
the second upright being in a second mounting position:
g) attaching a second connector to a second lower portion of the second upright;
h) attaching a second upper connector to a second upper portion of the second upright;
i) attaching a second lower end of the second climbing element to the second lower connector and a second upper end of the second climbing element to the second upper connector;
j) adjusting a second distance separating the second lower end and the second upper end of the second climbing element to bring the second distance to the first predetermined value;
k) immobilising the position of the second lower end and the position of the second upper end of the second climbing element relative to the second upright;
l) positioning the first upright and the second upright such that the first climbing element and the second climbing element extend parallel to a climbing direction;
m) adjusting the position of the first upright and the position of the second upright such that the first lower end of the first climbing element and the second lower end of the second climbing element lie in a plane substantially orthogonal to a climbing direction.

An easy securing of the climbing elements of two uprights are thus obtained, without having to intervene on the upper part of these. Such securing is easily reproducible and allows to secure all of the uprights of one same storage unit comprising several rack elements.

The method has a particularly profitable application when the first climbing element comprises a first chain and the second climbing element comprises a second chain.

The mounting operations are simplified when the first mounting position and/or the second mounting position is substantially horizontal and/or the climbing direction is substantially vertical.

The setting operations are facilitated when step b) of attaching a first upper connector to a first upper portion of the first upright comprises a step b') of positioning the first upper connector to a third predetermined distance of the first lower connector and step d) of adjusting a first distance separating the first lower end and the first upper end of the first climbing element to bring the first distance to a first predetermined value comprises a step d') of adjusting a fourth distance separating the first upper connector of the first upper end of the first climbing element to bring the fourth distance to a third predetermined value.

The setting operations are facilitated in the same way when step h) of attaching a second upper connector to a second upper portion of the second upright comprises a step h') of positioning the second upper connector to a second predetermined distance and step j) of adjusting a second distance separating the second lower end and the second upper end of the second climbing element to bring the second distance to the first predetermined value comprises a step j') of adjusting a fifth distance separating the second upper connector of the second upper end of the second climbing element to bring the fifth distance to the third predetermined value.

The installation precision of the first climbing element is improved when step c) of attaching a first lower end of the first climbing element to the first lower connector and a first upper end of the first climbing element to the first upper connector comprises a step c') of attaching a first profile for supporting the first climbing element to the first upright.

The operational silence of the storage unit and the vibrating urging of the uprights is improved when step c) of attaching a first lower end of the first climbing element to the first lower connector and a first upper end of the first climbing element to the first upper connector also comprises a step c") which follows step c') of attaching a first profile for supporting the first climbing element to the first upright, step c") comprising the placing of a first damper element between the first support profile and the first climbing element.

Advantageously, the method comprises a step b') prior to step c) of attaching a first lower end of the first climbing element to the first lower connector and a first upper end of the first climbing element to the first upper connector, step b') comprising the placing of first support profiles intended to keep the first profile at a non-zero distance from the first upright.

The installation precision of the second climbing element is improved when step i) of attaching a second lower end of the second climbing element to the second lower connector and a second upper end of the second climbing element to the second upper connector comprises a step i') of attaching a second profile for supporting the second climbing element to the second upright.

The operational silence of the storage unit and the vibrating urging of the uprights is improved when step i) of attaching a second lower end of the second climbing element to the second lower connector and a second upper end of the second climbing element to the second upper connector also comprises a step i") which follows step i') of attaching a second profile for supporting the second climbing element to the second upright, step i") comprising the placing of a second damper element between the first support profile and the second climbing element.

Advantageously, the method comprises a step h') prior to step i) of attaching a second lower end of the second climbing element to the second lower connector and a second upper end of the second climbing element to the second upper connector, step h') comprising the placing of second support profile intended to keep the second profile at a non-zero distance from the second upright.

The climbing elements can be subjected to high tensions when the method comprises an additional step k') located before step l) of positioning the first upright and the second upright such that the first climbing element and the second climbing element extend parallel to a climbing direction, step k') consisting of mounting a first reinforcing mesh on the first upright and/or mounting a second reinforcing mesh on the second upright.

The invention also relates to a storage rack element comprising at least one first upright and one second upright parallel to one another and provided respectively with a first climbing element and a second climbing element, wherein
- a first lower end of the first climbing element is attached to a first lower end of the first upright and a first upper end of the first climbing element is attached to a first upper end of the first upright;
- a second lower end of the second climbing element is attached to a second lower end of the second upright and a second upper end of the second climbing element is attached to a second upper end of the second upright;
- the position of the first upright and the position of the second upright are arranged such that the first lower end of the first climbing element and the first lower end of the second climbing element lie in a plane substantially orthogonal to a climbing direction. According to a particular embodiment, the first climbing element comprises a first chain and the second climbing element comprises a second chain.

Finally, the invention also relates to a unit comprising a plurality of storage rack elements according to the invention, the plurality of storage rack elements delimiting at least one first circulation span in a main circulation direction.

Other characteristics and advantages of the invention will appear upon reading the following description of non-limiting particular embodiments of the invention.

BRIEF DESCRIPTION OF THE DRAWINGS

Reference will be made to the accompanying figures, among which

DETAILED DESCRIPTION OF THE INVENTION

Figure 1:
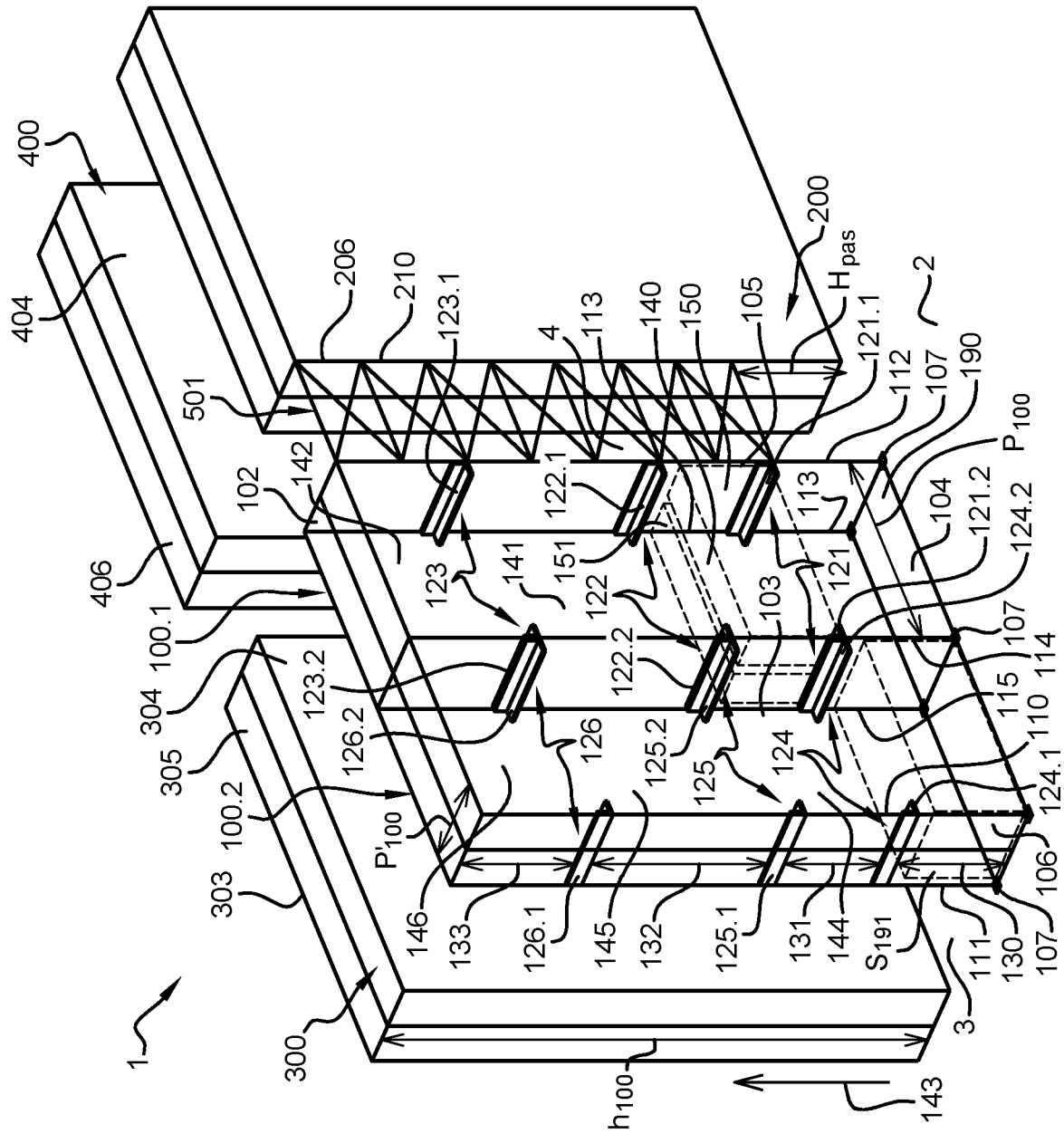
FIG. 1 is a schematic, perspective view of a storage unit according to the invention.

In reference to FIGS. 1 to 6, the storage unit according to the invention, and generally designated 1, comprises a first storage rack 100, a second storage rack 200, a third storage rack 300 and a fourth storage rack 400.

The first storage rack 100 is substantially parallelpiped and comprises a first lower face 100 born on a support surface—here a concrete floor 2 of a warehouse, not represented. The first rack 100 also comprises a first upper face 102 parallel to the first lower face 101 separated by a first height $h_{100}$, a first right longitudinal face 104 and a first left longitudinal face 103—here substantially vertical, separated by a first depth $p_{100}$—here equal to 905 millimetres. The first left longitudinal face 103 and the first right longitudinal face 104 connect a first front transverse face 105 and a first rear transverse face 106, separated by a first width lion.

The first rack 100 comprises a first right rear upright 110, a first left rear upright 111, a first right front upright 112 and a first left front upright 113, parallel to one another and which define the vertical edges of the first rack 100. The first rack 100 also comprises a first right intermediate upright 114 equidistant from the first right rear upright 110 and from the first right front upright 112. The first rack 100 also comprises a first left intermediate upright 115 equidistant from the first left rear upright 111 and from the first left front upright 113. The first right rear upright 110, the first right front upright 112 and the first right intermediate upright 114 extend in the plane of the first right longitudinal face 104 and are attached to the floor 2 using anchoring plates 107 engaging with threaded rods sealed to the floor 2, not represented. The first left rear main upright 111, the first left front upright 113 and the first left intermediate upright 115 extend in the plane of the first left longitudinal face 103 and are attached to the floor 2 using anchoring plates 107 engaging with threaded rods sealed to the floor 2, not represented.

The first rack 100 also comprises a first pair of front lower slides 121 which extends between the first right longitudinal face 104 and the first left longitudinal face 103. The first pair of front lower slides 121 comprises a first front lower slide 121.1 and a first front median lower slide 121.2, here in the form of metal angle bars. The first front lower slide 121.1 extends parallel to the first lower face 101 and is bolted on the one hand, to the first right front upright 112 and on the other hand, to the first left front upright 113. The first front median lower slide 121.2 extends parallel to the first lower face 101 and is bolted on the one hand, to the first right intermediate upright 114 and on the other hand, to the first left intermediate upright 115. The first pair of front lower slides 121 extends at a first basic distance 130—here equal to 495 millimetres—from the first lower face 101.

The first rack 100 also comprises a first pair of front intermediate slides 122 which extends between the first right longitudinal face 104 and the first left longitudinal face 103. The first pair of front intermediate slides 122 comprises a first front intermediate slide 122.1 and a first front median intermediate slide 122.2, here in the form of metal angle bars. The first front intermediate slide 122.1 extends parallel to the first lower face 101 and is bolted on the one hand, to the first right front upright 112 and on the other hand, to the left front upright 113. The first front median intermediate slide 122.2 extends parallel to the first lower face 101 and is bolted on the one hand, to the first right intermediate upright 114 and on the other hand, to the first left intermediate upright 115. The first pair of front intermediate slides 122 extends at a first lower distance 131—here equal to 225 millimetres—from the first pair of front lower slides 121.

The first rack 100 also comprises a first pair of front upper slides 123 which extends between the first right longitudinal face 104 and the first left longitudinal face 103. The first pair of front upper slides 123 comprises a first front upper slide 123.1 and a first front median upper slide 123.2, here in the form of metal angle bars. The first front upper slide 123.1 extends parallel to the first lower face 101 and is bolted on the one hand, to the first right front upright 112 and on the other hand, to the first left front upright 113. The first front median upper slide 123.2 extends parallel to the first lower face 101 and is bolted on the one hand, to the first right intermediate upright 114 and on the other hand, to the first left intermediate upright 115.

The first pair of front upper slides 123 extends at a first intermediate distance 132—here equal to 325 millimetres—from the first pair of front intermediate slides 122 and to a first upper distance 133—here equal to 225 millimetres—from the first upper face 102.

Homologously, the first rack 100 also comprises a first pair of rear lower slides 124 which extends between the first right longitudinal face 104 and the first left longitudinal face 103. The first pair of rear lower slides 124 comprises a first rear lower slide 124.1 and a first rear median lower slide 124.2, here in the form of metal angle bars. The first rear lower slide 124.1 extends parallel to the first lower face 101 and is bolted on the one hand, to the first right rear upright 110 and on the other hand, to the first left rear upright 111. The first rear median lower slide 124.2 extends parallel to the first lower face 101 and is bolted on the one hand, to the first right intermediate upright 114 and on the other hand, to the first left intermediate upright 115. The first pair of rear lower slides 124 extends at a first basic distance 130 from the first lower face 101.

The first rack 100 also comprises a first pair of rear intermediate slides 125 which extends between the first right longitudinal face 104 and the first left longitudinal face 103. The first pair of rear intermediate slides 125 comprises a first rear intermediate slide 125.1 and a first rear median intermediate slide 125.2, here in the form of metal angle bars. The first rear upper slide 126.1 extends parallel to the first lower face 101 and is bolted on the one hand, to the first right rear upright 110 and on the other hand, to the first left rear upright 111. The first rear median intermediate slide 125.2 extends parallel to the first lower face 101 and is bolted on the one hand, to the first right intermediate upright 114 and on the other hand, to the first left intermediate upright 115. The first pair of rear intermediate slides 125 extends at a first lower distance 131 from the first pair of lower slides 124.

The first rack 100 also comprises a first pair of rear upper slides 126 which extends between the first right longitudinal face 104 and the first left longitudinal face 103. The first pair of rear upper slides 126 comprises a first rear upper slide 126.1 and a first rear median upper slide 126.2, here in the form of metal angle bars. The first rear upper slide 126.1 extends parallel to the first lower face 101 and is bolted on the one hand, to the first right rear upright 110 and on the other hand, to the first left rear upright 111. The first rear median upper slide 126.2 extends parallel to the first lower face 101 and is bolted on the one hand, to the first right intermediate upright 114 and on the other hand, to the first left intermediate upright 115.

The first pair of rear upper slides 126 extends at a first intermediate distance 132 from the first pair of rear intermediate slides 125 and at a first upper distance 133 from the first upper face 102.

The first right front upright 112, the first left front upright 113, the first right intermediate upright 114, the first left intermediate upright 115, as well as the first pair of front lower slides 121, the first pair of front intermediate slides 122 and the first pair of front upper slides 123 compose a first front element 100.1 of the first rack 100.

The first right rear upright 110, the first left rear upright 111, the first right intermediate upright 114, the first left intermediate upright 115, as well as the first pair of rear lower slides 124, the first pair of rear intermediate slides 125 and the first pair of rear upper slides 126 compose a first rear element 100.2 of the first rack 100.

The substantially parallelepiped volume delimited in its lower part by the first pair of front lower slides 121, on its sides by the first right front upright 112, the first left front upright 113, the first right intermediate upright 114, the first intermediate upright 115 and in its upper part by the first pair of front intermediate slides 122 corresponds to a first front lower storage compartment 140.

A first front intermediate storage compartment 141 is delimited in its lower part by the first pair of intermediate slides 122, on its sides by the first right front upright 112, the first left front upright 113, the first right intermediate upright 114, the first intermediate upright 115 and in its upper part by the first pair of front upper slides 123.

A first front upper storage compartment 142 is delimited in its lower part by the first pair of front upper slides 123, on its sides by the first right front upright 112, the first left front upright 113, the first right intermediate upright 114, the first intermediate upright 115 and in its upper part by the first upper face 102.

The first front intermediate compartment 141 and the first front upper compartment 142 are superposed on the first front lower compartment 140 in a first vertical stacking direction 143. The height of the first front lower compartment 140 considered in the first stacking direction 143 is equal to the first lower distance 131.

The height of the first front intermediate compartment 141 considered in the first stacking direction 143 is equal to the first intermediate distance 132.

The height of the first front upper compartment 142 considered in the first stacking direction 143 is equal to the first upper distance 133.

The substantially parallelepiped volume delimited in its lower part by the first pair of rear lower slides 124, on its sides by the first right rear upright 110, the first left rear upright 111, the first right intermediate upright 114, the first intermediate upright 115 and in its upper part by the first pair of rear intermediate slides 125 corresponds to a first rear lower storage compartment 144.

A first rear intermediate storage compartment 145 is delimited in its lower part by the first pair of rear intermediate slides 125, on its sides by the first right rear upright 110, the first left rear upright 111, the first right intermediate upright 114, the first intermediate upright 115 and in its upper part by the first pair of rear upper slides 126.

A first rear upper storage compartment 146 is delimited in its lower part by the first pair of rear upper slides 126, on its sides by the first right rear upright 110, the first left rear upright 111, the first right intermediate upright 114, the first intermediate upright 115 and in its upper part by the first upper face 102.

The first rear intermediate compartment 145 and the first rear upper compartment 146 are superposed on the first rear lower compartment 144 in the first vertical stacking direction 143. The height of the first rear lower compartment 144 considered in the first stacking direction 143 is equal to the first lower distance 131. The height of the first rear intermediate compartment 145 considered in the first stacking direction 143 is equal to the first intermediate distance 132.

The height of the first rear upper compartment 146 considered in the first stacking direction 143 is equal to the first upper distance 133.

As can be seen in FIG. 1, the first intermediate distance 132 is greater than the first lower distance 131 and the first upper distance 133.

Figure 2:
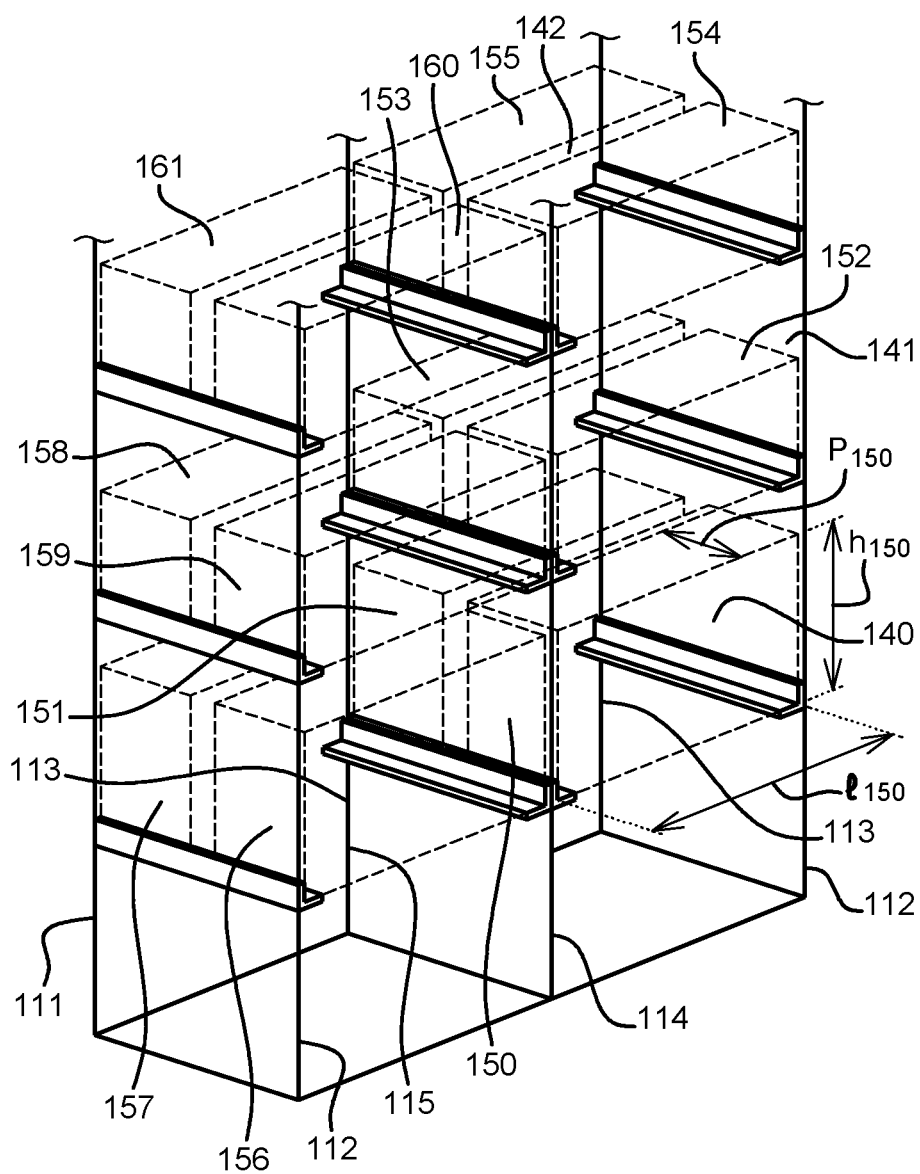
FIG. 2 is a detailed schematic, perspective view of a rack element of FIG. 1.
Figure 3:
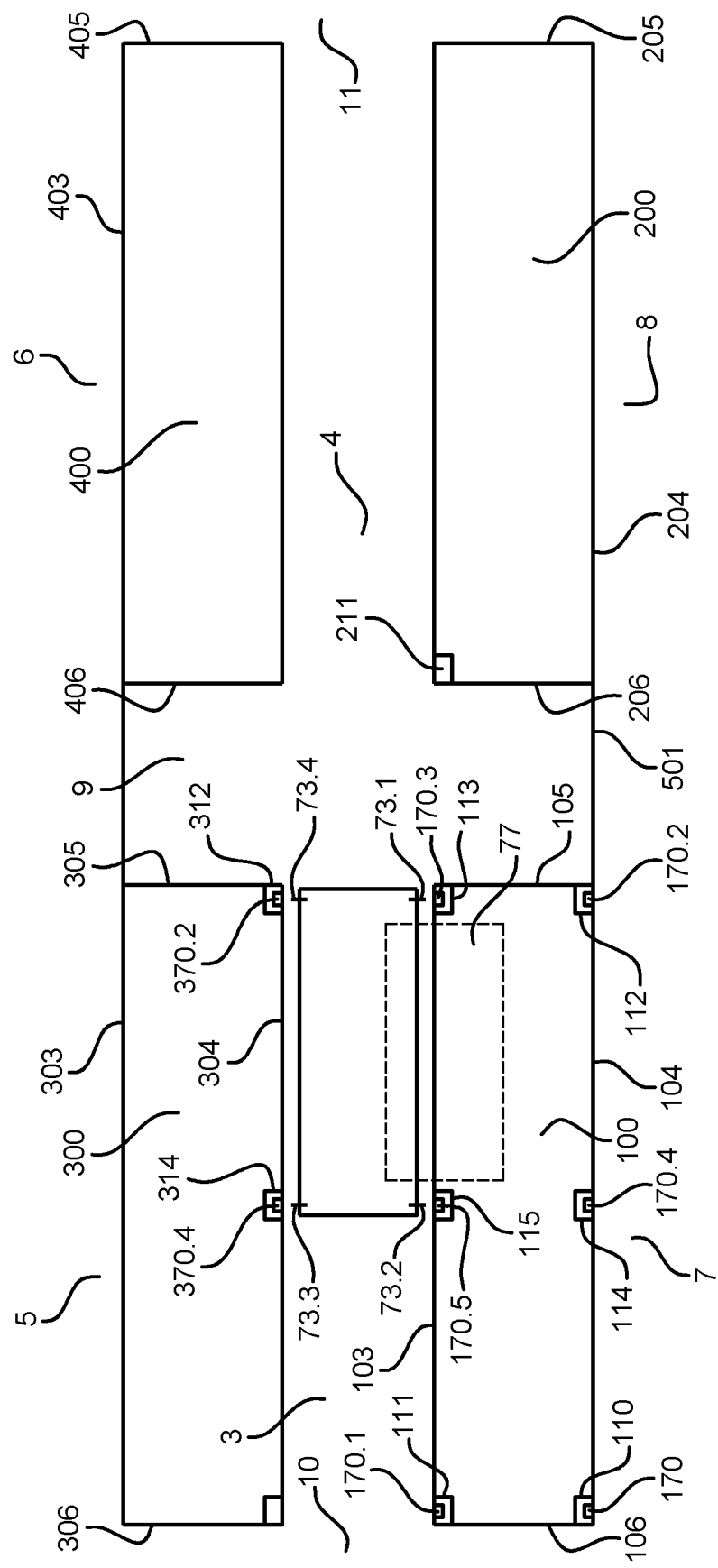
FIG. 3 is a schematic top view of the storage unit of FIG. 1.
Figure 4:
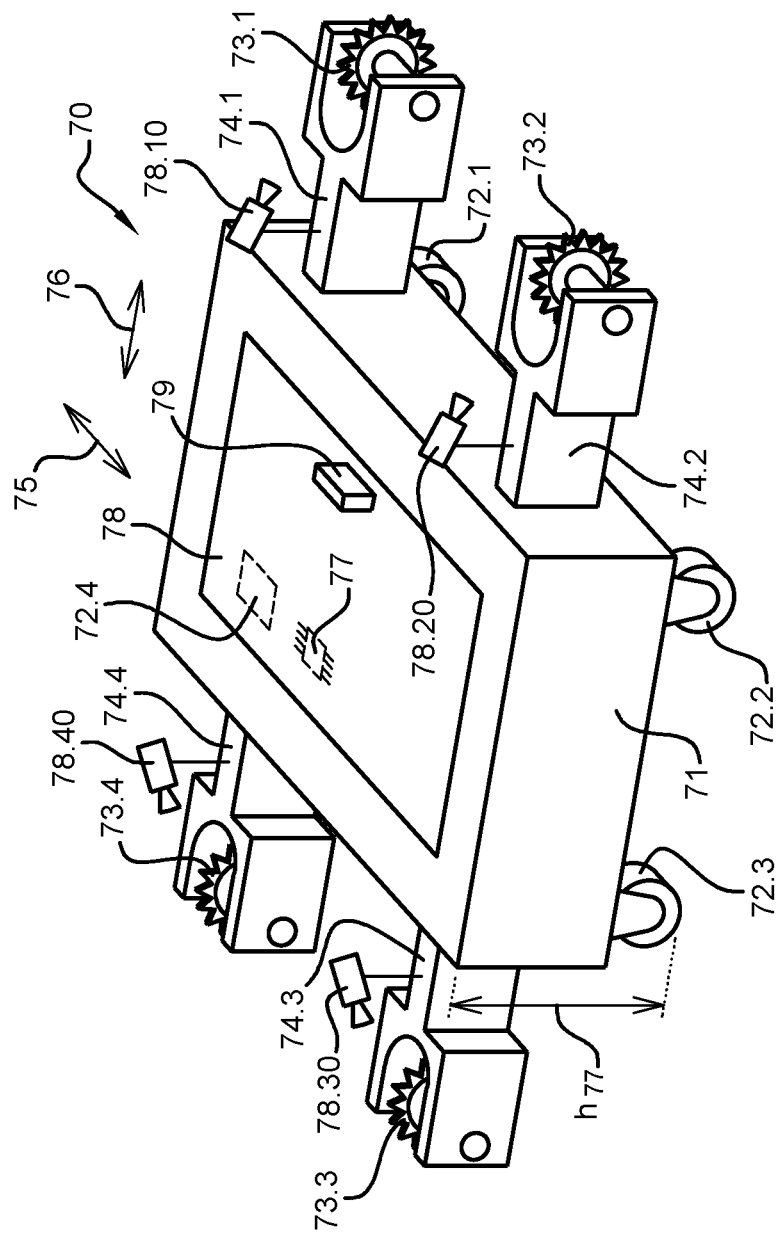
FIG. 4 is a schematic, perspective view of a carriage of the storage unit of FIG. 1.

The first front lower compartment 140 receives a first right front lower container 150 and a first left front lower container 151 both slidingly mounted on the first pair of front lower slides 121. The first right front lower container 150 and the first left front lower container 151 are, here, identical and of substantially parallelepiped shape. As can be seen in FIG. 2, the first right front lower container 150 has a height $h_{150}$ substantially less than the first lower distance 131. The width $l_{150}$ of the first right front lower container 150 is substantially equal to half the first width lion. The depth $p_{150}$ of the first right front lower container 150 is half the first depth $p_{100}$. Thus, the first front lower compartment 140 being open and therefore accessible from the first right longitudinal face 104 and the first left longitudinal face 103, it is possible to access the first right front container 150 without needing to handle the first left front container 151, and vice versa.

Homologously, the first front intermediate compartment 141 receives a first right front intermediate container 152 and a first left front intermediate container 153.

The first front upper compartment 142 receives a first right front upper container 154 and a first left front upper container 155. The first rear lower compartment 144 receives a first right rear container 156 and a first left rear lower container 157. The first rear intermediate compartment 145 receives a first right rear intermediate container 158 and a first left rear intermediate container 159.

The first rear upper compartment 146 receives a first right rear upper container 160 and a first left rear upper container 161.

Figure 5:
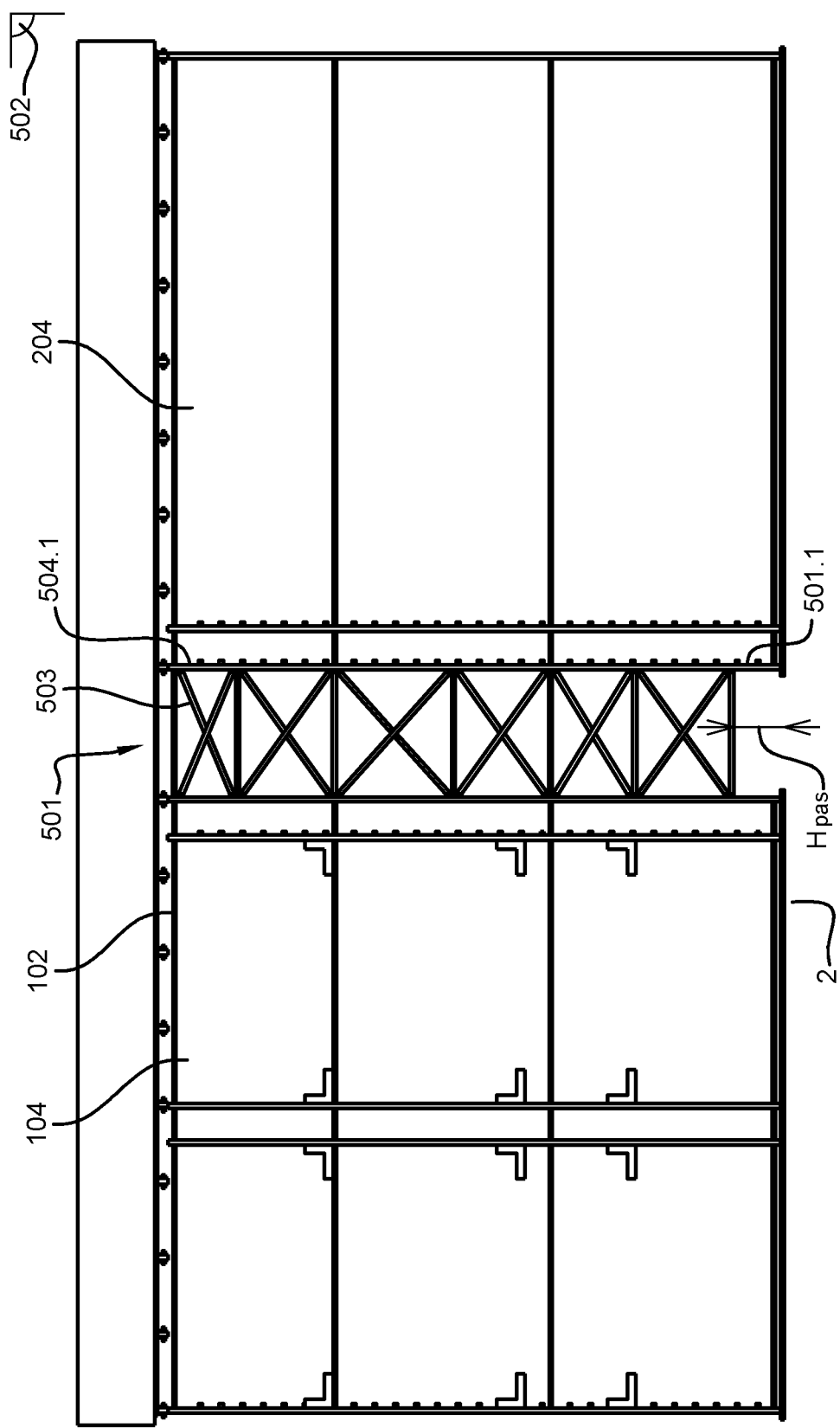
FIG. 5 is a schematic side view of the storage unit of FIG. 1.

As can be seen in FIGS. 1 and 5, a first substantially parallelepiped front free passage volume 190 is delimited by the first lower face 101 and the first pair of front lower slides 121. The first right front upright 112, the first left front upright 113, the first right intermediate upright 114 and the first left intermediate upright 115 define the vertical edges of the first front volume 190.

The first front volume 190 has a first front passage section S190 of which the first dimension in a vertical direction is equal to the first basic distance 130, that is 495 millimetres. The second dimension of the section S190 in a transverse direction connecting the first left longitudinal face 103 and the first right longitudinal face 104 is substantially equal to the first depth p100, i.e. 950 millimetres.

A first substantially parallelepiped rear free passage volume 191 is delimited by the first lower face 101 and the first pair of rear lower slides 124. The first right rear upright 110, the first left rear upright 111, the first right intermediate upright 114 and the first left intermediate upright 115 define the vertical edges of the first rear volume 191.

The first front volume 191 has a first rear section S191 identical to the first front passage section S190.

The first right rear upright 110 is provided with a first right rear climbing chain 170 with 300 links extending vertically along the first right rear upright 110. The first left rear upright 111 is provided with a first left rear climbing chain 170.1 with 300 links extending vertically along the first left rear upright 111. The first right front upright 112 is provided with a first right front climbing chain 170.2 with 300 links extending vertically along the first right front upright 112. The first left front upright 113 is provided with a first left front climbing chain 170.3 with 300 links extending vertically along the first left front upright 113. The first right intermediate upright 114 is provided with a first right intermediate climbing chain 170.4 with 300 links extending vertically along the first right intermediate upright 114. The first left intermediate upright 115 is provided with a first left intermediate climbing chain 170.5 with 300 links extending vertically along the first left intermediate upright 115.

The mounting and the securing of the climbing chains 170 to 170.5 will be described in reference to the mounting and the securing of the first left front chain 170.3 and of the first left intermediate chain 170.5 respectively on the first left front upright 113 and the first left intermediate upright 115. The first left front chain 170.3 is composed of first links 171.3 connected by first axes 172.3. Each first link 171.3 comprises a first left plate 173.3 and a first right plate 174.3. The first left plate 173.3 has a first left outer side 175.3 and the first right plate 174.3 has a first right outer side 176.3. Each first axis 172.3 has a first left end 177.3 which projects from the first left outer side 175.3 and a first right end 178.3 which projects from the first right outer side 176.3. The first left intermediate chain 170.5 is of similar design to the first left front chain 170.3. The method for securing the first left front upright 113 and the first left intermediate upright 115 is described in reference to FIGS. 14 to 17.

Figure 7:
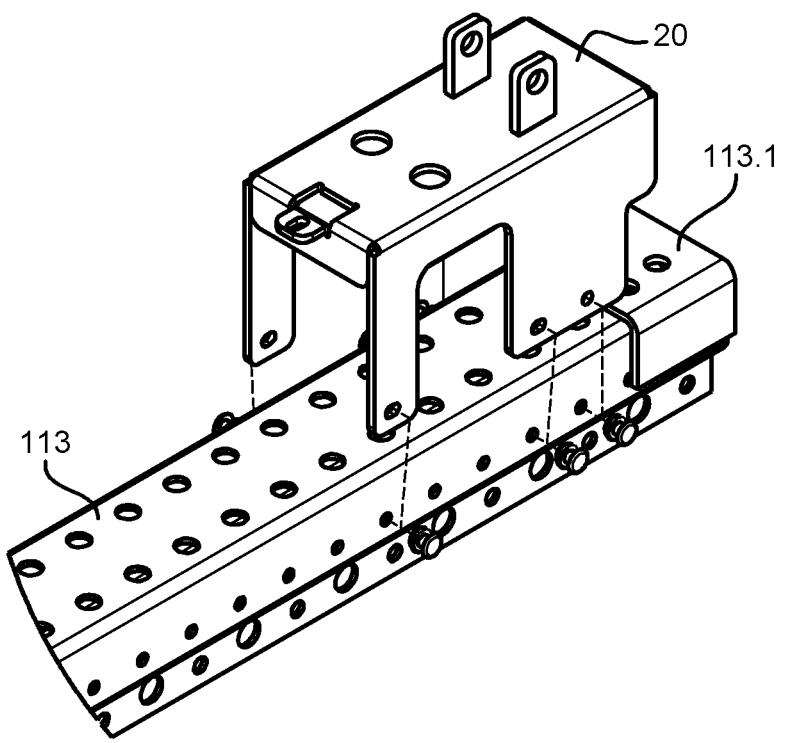
FIG. 7 is a schematic, perspective view of a first step of a method for securing a chain according to the invention.

According to a first step represented in FIG. 7, the first left front upright 113 (here, a perforated U-shaped profile) being in a substantially horizontal mounting position, a first left front lower connector—here a first left front lower guiding device 20—is bolted on a first left front lower portion 113.1 of the first left front upright 113.

Figure 8:
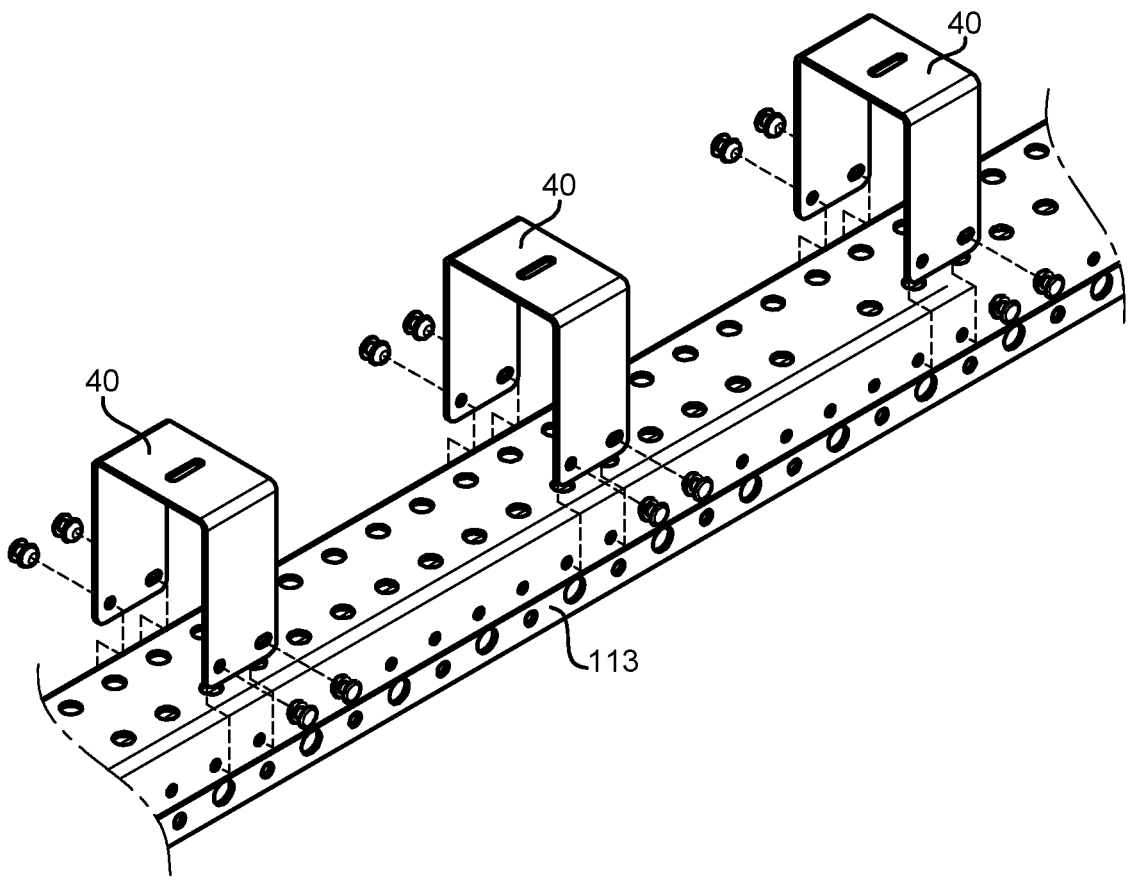
FIG. 8 is a schematic, perspective view of a second step of a method for securing a chain according to the invention.
Figure 9:
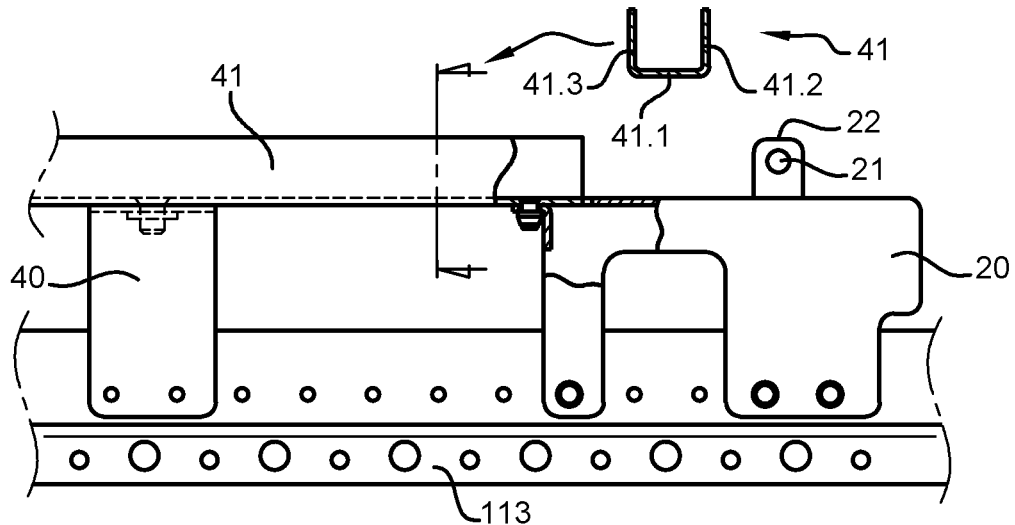
FIG. 9 is a schematic, perspective view of a third step of a method for securing a chain according to the invention.

According to a second step represented in FIG. 8, first jumpers 40 are bolted on the upright 113 at regular intervals. According to a third step represented in FIG. 9, a first profile 41—here a profile of which the cross-section is U-shaped—is bolted on the jumpers 40 and on the first left front lower guiding device 20. The first profile 41 comprises a first web 41.1 which connects a first right wing 41.2 and a first left wing 41.3.

Figure 10:
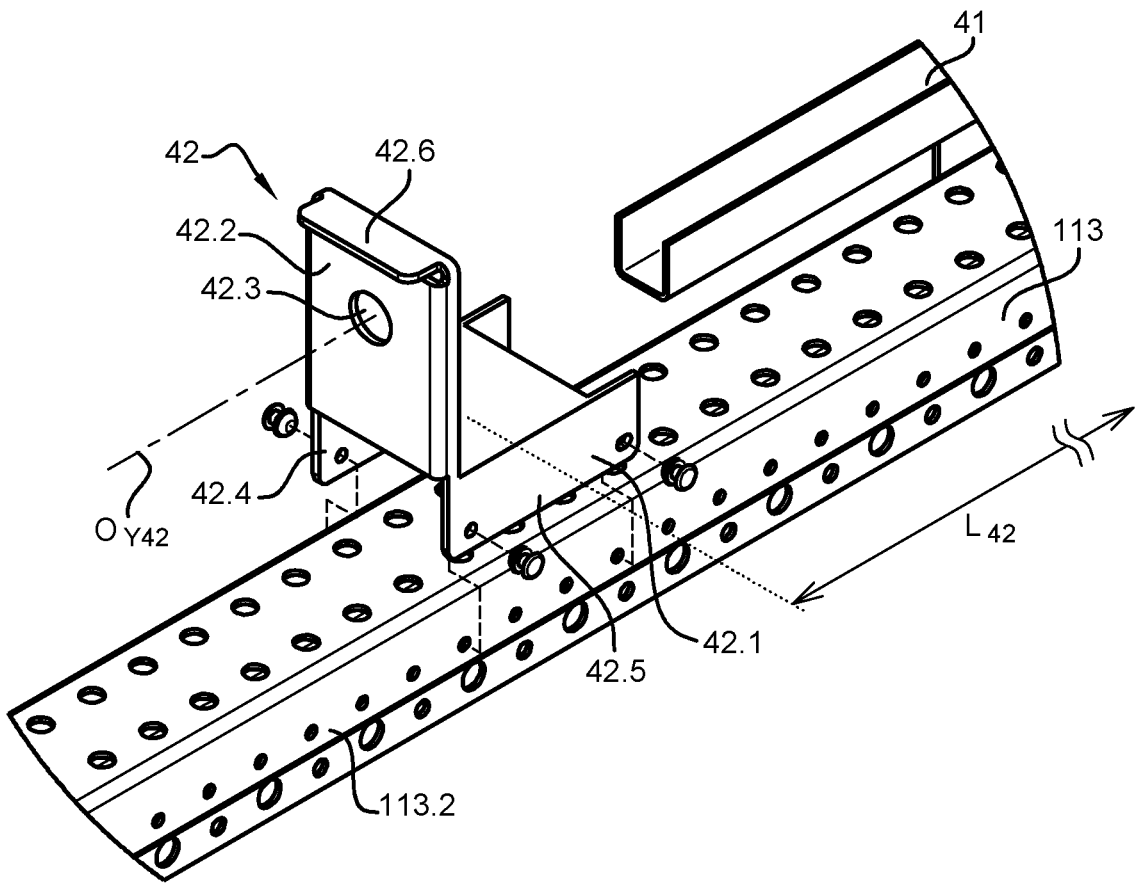
FIG. 10 is a schematic, perspective view of a fourth step of a method for securing a chain according to the invention.

According to a fourth step represented in FIG. 10, a first left front upper connector 42 is bolted on a first upper portion 113.2 of the first left front upright 113. The first left front upper connector 42 comprises a frame 42.1 provided with a transverse wall 42.2 which supports a first hole 42.3. The frame 42.1 comprises a right panel 42.4 and a left panel 42.5 respectively bolted on the right wing and the left wing of the first left front upright 113.

The first left front upper connector 42 is installed on a first upper portion 113.2 of the first left front upright 113 at a first predetermined distance $L_{42}$ from the first left front lower guiding device 20. The predetermined distance $L_{42}$ extends, here, between the axis O21 of a bore 21 of a first pair of flanges 22 of the first left front lower guiding device 20 and the upper surface 42.6 of the transverse wall 42.2.

Figure 11:
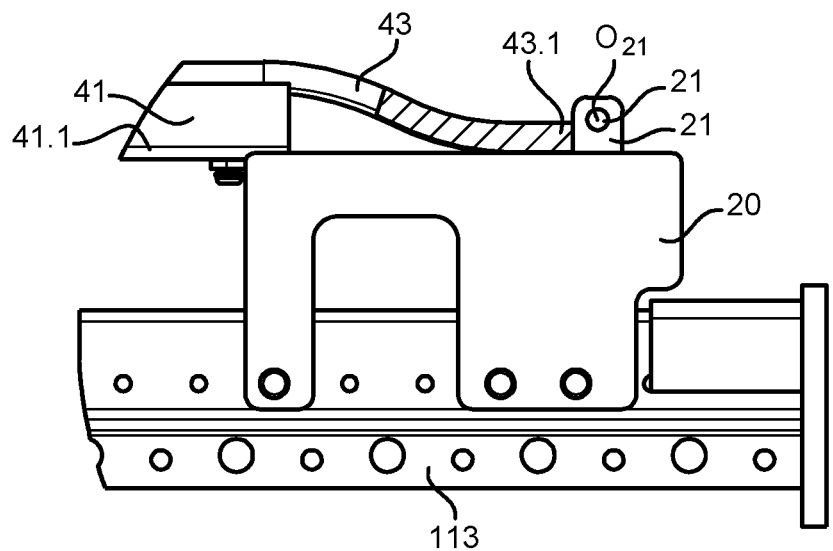
FIG. 11 is a schematic perspective view of a fifth step of a method for securing a chain according to the invention.

According to a fifth step represented in FIG. 11, a first nitrile damper element 43 is deposited on the web 41.1 of the profile 41 such that its lower end 43.1 comes substantially directly below the axis O21 of the first left front lower guiding device 20. According to a sixth step represented in FIG. 12, a first lower end 170.31 of the first left front chain 170.3 is attached to the first pair of flanges 22 using a first pin 44. According to a seventh step represented in FIG. 13, a first upper end 170.32 of the first left front chain 170.3 is connected by rapid chain fastener 45 to the first chain tensioner 46.

The first chain tensioner 46 comprises a threaded rod 46.1 provided on the one hand, with a bore 46.2 for receiving the second rapid chain fastener 45 and on the other hand, a free threaded end 46.3 for receiving a bearing washer 46.4 and a nut 46.5. The threaded rod 46.1 extends through the first hole 42.3 of the transverse wall and through the bearing washer 46.4. According to an eighth step represented in FIG. 14, the nut 46.5 is acted on to adjust a distance $L_{46}$ separating the first upper end 170.32 of the first left front chain 170.3 of the transverse wall 42.2 and to bring it to a predetermined value $d_{46}$, here equal to 22 millimetres. A locknut 46.8 locks the position of the threaded rod 46.1 relative to the first left front upper connector 42 and thus immobilises the position of the first upper end 170.32 of the first left front chain 170.3 relative to the first upright 113. By adjusting the distance $L_{46}$, the distance $L_{170.3}$ which separates the first lower end 170.31 and the first upper end 170.32 of the first left front chain 170.3 is acted on, such that it is equal to 2500 millimetres.

Figure 15:
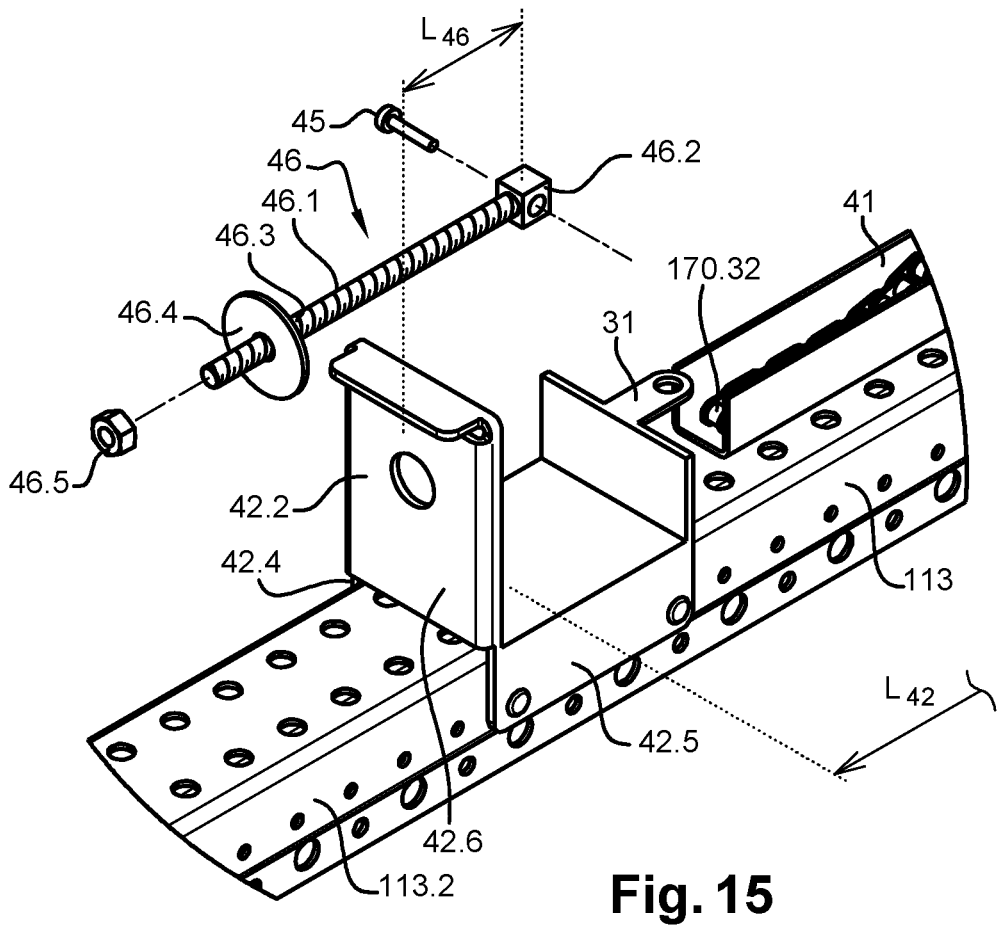
FIG. 15 is a schematic, perspective view of a seventh step of a method for securing a chain according to the invention.

According to a ninth step represented in FIG. 15, a first left front reinforcing mesh 183 is mounted on the first left front upright 113.

Figure 16:
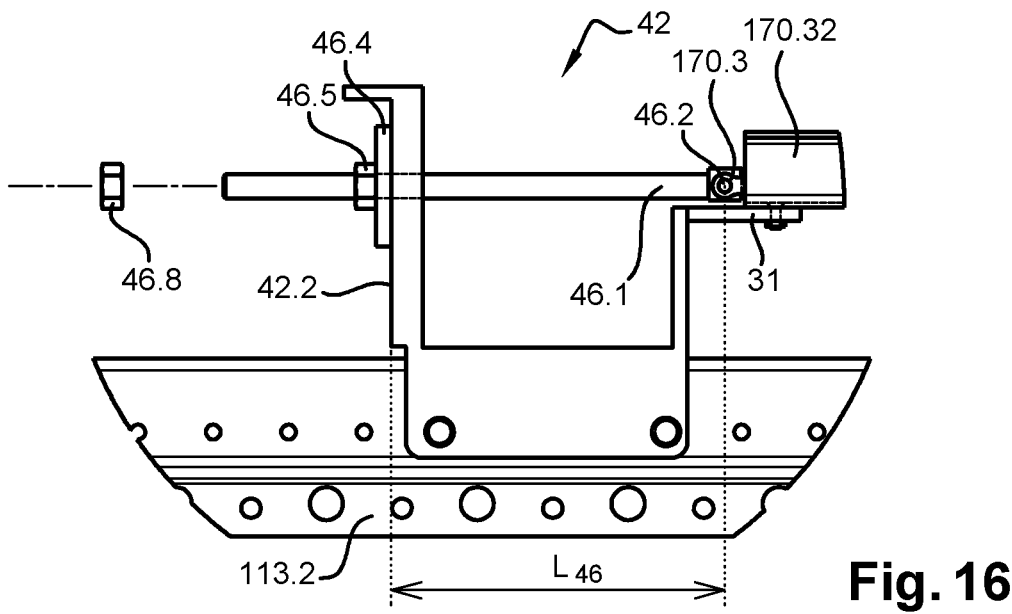
FIG. 16 is a schematic, perspective view of an eighth step of a method for securing a chain according to the invention.

The first left intermediate upright 115 is treated identically and receives a second lower guiding device 50 on a second lower portion 115.1 of the first left intermediate upright 115. As can be seen in FIG. 16, second jumpers 51 bolted on the first left intermediate upright 115 support a second profile 52 identical to the first profile 41 which receives a second nitrile damper element 53. A second left intermediate connector 54 is installed on a second upper portion 115.2 of the first left intermediate upright 115 at a second predetermined distance $L_{54}$ of the second left intermediate lower guiding device 50.

The first lower end 170.51 of the first left intermediate chain 170.5 is connected to the second lower guiding device 50 and the first upper end 170.52 of the first left intermediate chain 170.5 is connected to the second left intermediate upper connector 54. The distance $L_{170.5}$ separating the first lower end 170.51 and the first upper end 170.52 of the first left intermediate chain 170.5 is adjusted by acting on a second chain tensioner 55 identical to the first chain tensioner 46 such that the distance $L_{170.5}$ is equal to 9000 millimetres. A first left intermediate reinforcing mesh 185 is mounted on the first left intermediate upright 115.

Figure 17:
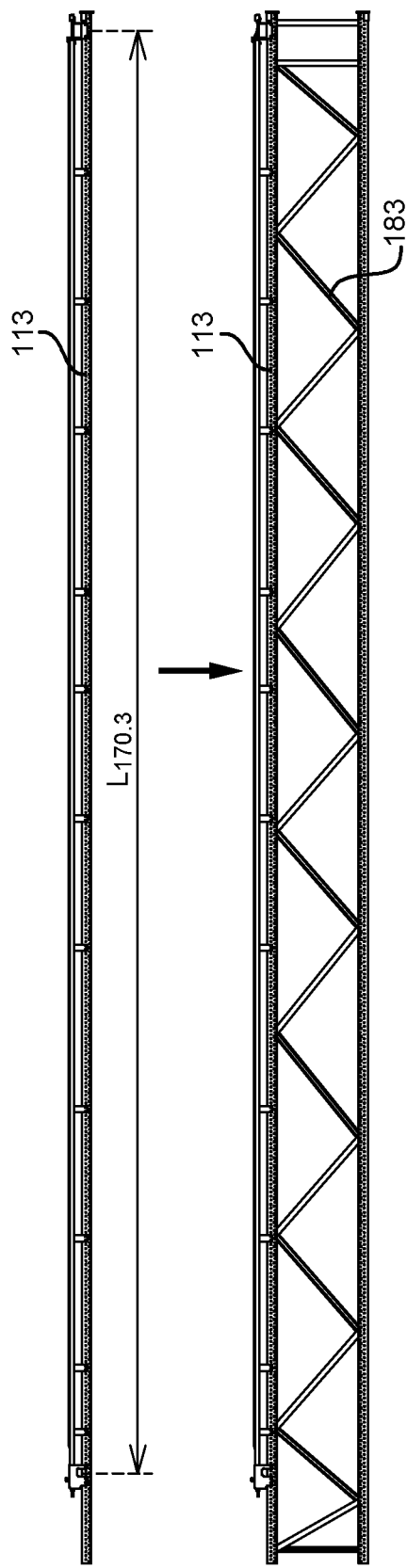
FIG. 17 is a schematic, perspective view of a ninth step of a method for securing a chain according to the invention.

According to a tenth following step represented in FIG. 17, the first left front upright 113 and the first left intermediate upright 115—provided respectively with the first left front mesh 183 and with the first left intermediate mesh 185 are positioned vertically, the plates 107 resting on the floor 2.

According to a final setting step, the position of the first left front upright 113 and the position of the first left intermediate upright 115 are set such that the first lower end 170.31 of the first left front chain 170.3 and the first lower end 170.51 of the first left intermediate chain 170.5 lie in a horizontal plane Ph. Once these positions are set, an adapted securing is, if necessary, done between the plates 107 and the floor 2.

The mounting of the first right rear chain 170, of the first left rear chain 170.1, of the first right front chain 170.2 and of the first right intermediate chain 170.4 is done identically so as to place the first ends of each of these chains in the same horizontal plane Ph.

The attachment of the guiding device 20 on the first left front lower portion 113.1 of the first left front upright 113 during the first step of method described above is done by bolting.

The joining of the first profile 41 to the guiding device 20 according to the second step of the method described above is done advantageously by bolting the first profile 41 on a lug 31 of the frame 42.1.

Figure 12:
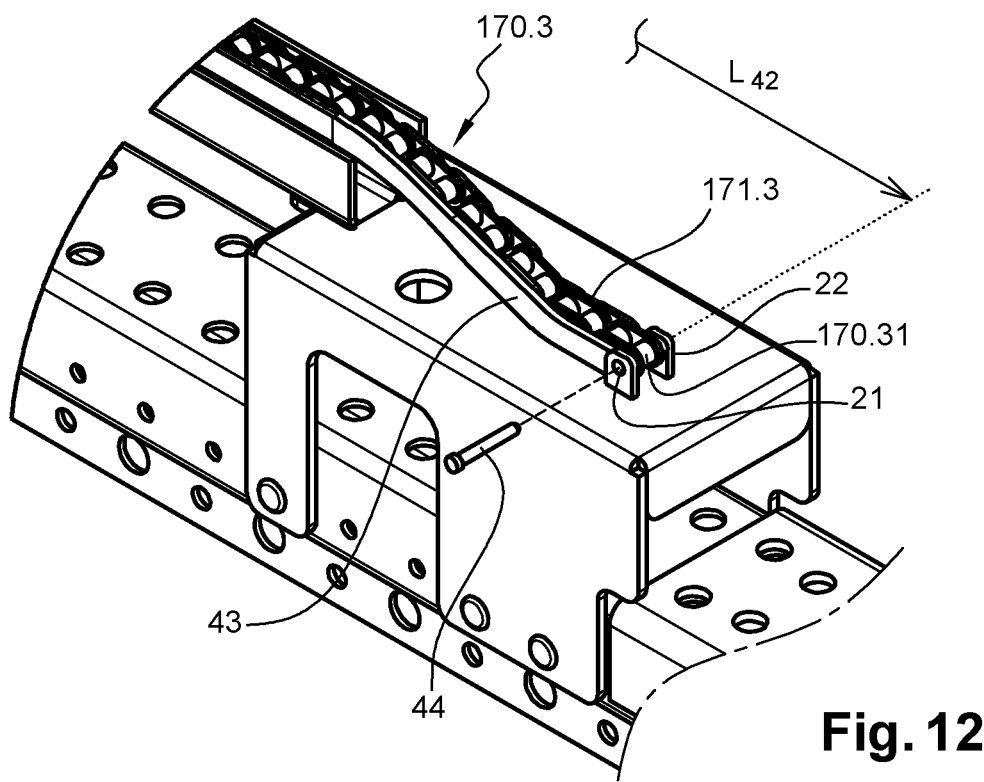
FIG. 12 is a schematic, perspective of a sixth step of a method for securing a chain according to the invention.
Figure 13:
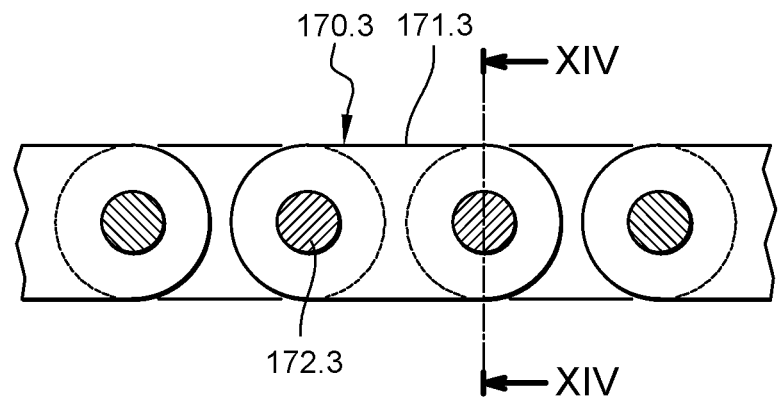
FIG. 13 is a detailed schematic side view of a chain.
Figure 14:
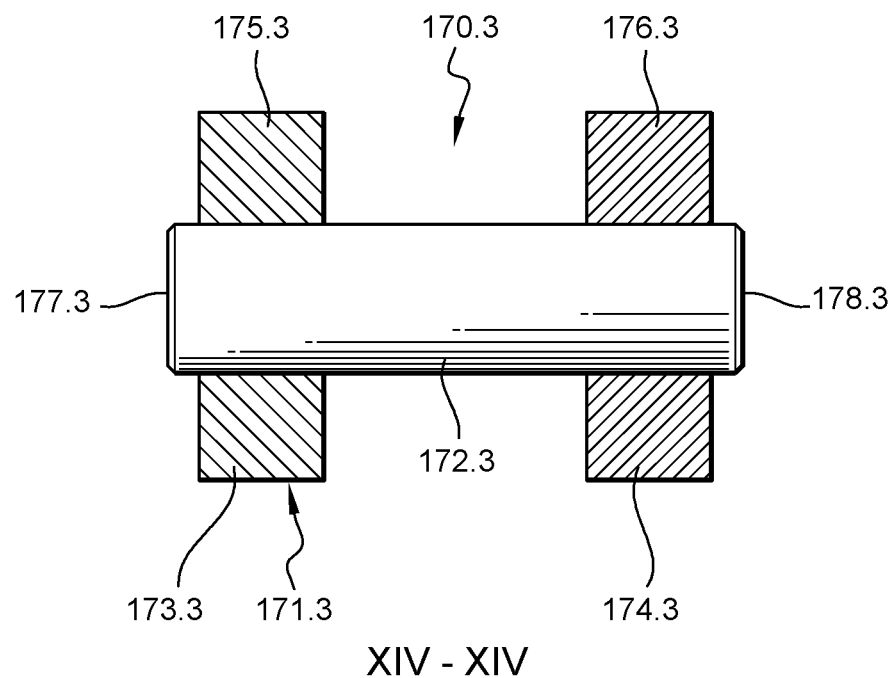
FIG. 14 is a schematic, cross-sectional view of the chain of FIG. 13.

Finally, and as can be seen in FIG. 12, during the sixth step of attaching the first lower end 170.31 of the first left front chain 170.3 to the stop 21, the first lower end 170.31 is introduced between the pair of flanges 22 and a first pin 44 is introduced through the bore 21 to extend in a bore of the first lower end 170.31.

The second rack 200, the third rack 300 and the fourth rack 400 are, here, identical to the first rack 100. The elements, identical or similar to those described in reference to the first rack 100, will have one same number reference plus one hundred when they relate to the second rack 200, plus two hundred when they relate to the third rack 300 and plus three hundred when they relate to the fourth rack 400.

Thus, and as can be seen in FIG. 1, the second rear transverse face 206 of the second rack 200 faces the first front transverse face 105 of the first rack 100. The third right longitudinal face 304 of the third rack 300 faces the first left longitudinal face 103 of the first rack 100 and defines a rear central circulation span 3. The fourth rack 400 is positioned such that the fourth rear transverse face 406 of the fourth rack 400 faces the third front transverse face 305 of the third rack 300. The fourth right longitudinal face 404 of the fourth rack 400 thus faces the second left longitudinal face 203 of the second rack 200 and defines a front central circulation span 4. A left rear circulation span 5 extends along the third left longitudinal face 303. A left front circulation span 6 extends along the fourth left longitudinal face 403. Similarly, a right rear circulation span 7 extends along the first right longitudinal face 104 and a right front circulation span 8 extends along the fourth right longitudinal face 404.

As can be seen in FIG. 2, the rear central span 3, the front central span 4, the left rear span 5, the left front span 6, the right rear span 7 and the right front rear span 8 opening onto a central circulation avenue 9 which is bordered by the first front transverse face 105, the second rear transverse face 206, the third front transverse face 305 and the fourth rear transverse face 406. The rear central span 3, the left rear span 5 and the right rear span 7 open onto a rear circulation avenue 10 which is bordered by the first rear transverse face 106 and the third rear transverse face 306. The front central span 4, the left front span 6 and the right front rear span 8 open onto a front circulation avenue 11 which is bordered by the second front transverse face 205, and the fourth front transverse face 405.

The storage unit 1 is integrated with an order preparation system 90 comprising a first automated guide carriage 70 and a second automated guide carriage 80 connected to a control and command unit 91 provided with wireless communication means 92 with the first carriage 70 and the second carriage 80. The order preparation system 90 also comprises a removal area 93 provided with an unloading ramp 94. In reference to FIG. 4, the first carriage 70 has a substantially parallelpiped-shaped body 71 and comprises four motorised driving wheels 72.1 to 72.4, as well as a first gearwheel 73.1, a second gearwheel 73.2, a third gearwheel 73.3 and a fourth gearwheel 73.4. The driving wheels 72.1 to 72.4 allow the first carriage 70 to move over the floor 2 back and forth in a main direction 75 and to turn. The gearwheels 73.1 to 73.4 are respectively mounted on the ends of a first retractable arm 74.1, of a second retractable arm 74.2, of a third retractable arm 74.3 and of a fourth retractable arm 74.4 deployed from the body 71 parallel to a transverse direction 76 orthogonal to the main direction 75 and substantially parallel to the floor 2. The gearwheels 73.1 to 73.4 are rotationally mounted about an axis substantially parallel to the main direction 75.

All of the actuators of the carriage which move the driving wheels 72.1 to 72.4, the gearwheels 73.1 to 73.4, as well as the actuators for retracting the retractable arms 74.1 to 74.4 are connected to a driving unit 77 provided with means for communicating wirelessly with the control and command unit 91.

A first camera 78.10 is attached to the first arm 74.1 to capture an image of the first gearwheel 73.1 and its surroundings. Homologously, a second camera 78.20, a third camera 78.30 and a fourth camera 78.40 are respectively attached to the second arm 74.22, to the third arm 74.3 and to the fourth arm 74.4 to respectively capture an image of the second gearwheel 73.2 and its surroundings, an image of the third gearwheel 73.3 and its surroundings and an image of the fourth gearwheel 73.4 and its surroundings. The cameras 78.10 to 78.40 are connected to the driving unit 77.

The first carriage 70 receives an upper plate 78 mounted to slide projecting from the body 71 in the transverse direction 76. The plate 78 comprises a lug 79 which extends projecting in a plane orthogonal to that of the plate 78. The upper surface of the plate 78 extends at a distance h78—here equal to 260 millimetres—from the floor 2 when the wheels 72.1 to 72.4 of the first carriage 70 rest on the floor 2.

The second carriage 80 is of construction identical to that of the first carriage 70.

As can more specifically be seen in FIGS. 1 and 5, a first mesh 501 extends in a first vertical plane 502. The first right longitudinal face 104 and the second right longitudinal face 204 also lie in the first plane 502. The first mesh 501 is composed of steel angle bars 503, bolted to make triangulated systems 504 which connect the first right front upright 112 and the second right rear upright 210. The first mesh 501 extends from the first upper face 102 and has a first lower end 501.1 extended from the floor 2 by a passage height $H_{pas}$ equal to 485 millimetres.

The first mesh 501 thus ensures a transfer of horizontal forces of the first rack 100 by the second rack 200 and vice versa, increasing the resistance of the first rack 100 to the horizontal forces.

Figure 6:
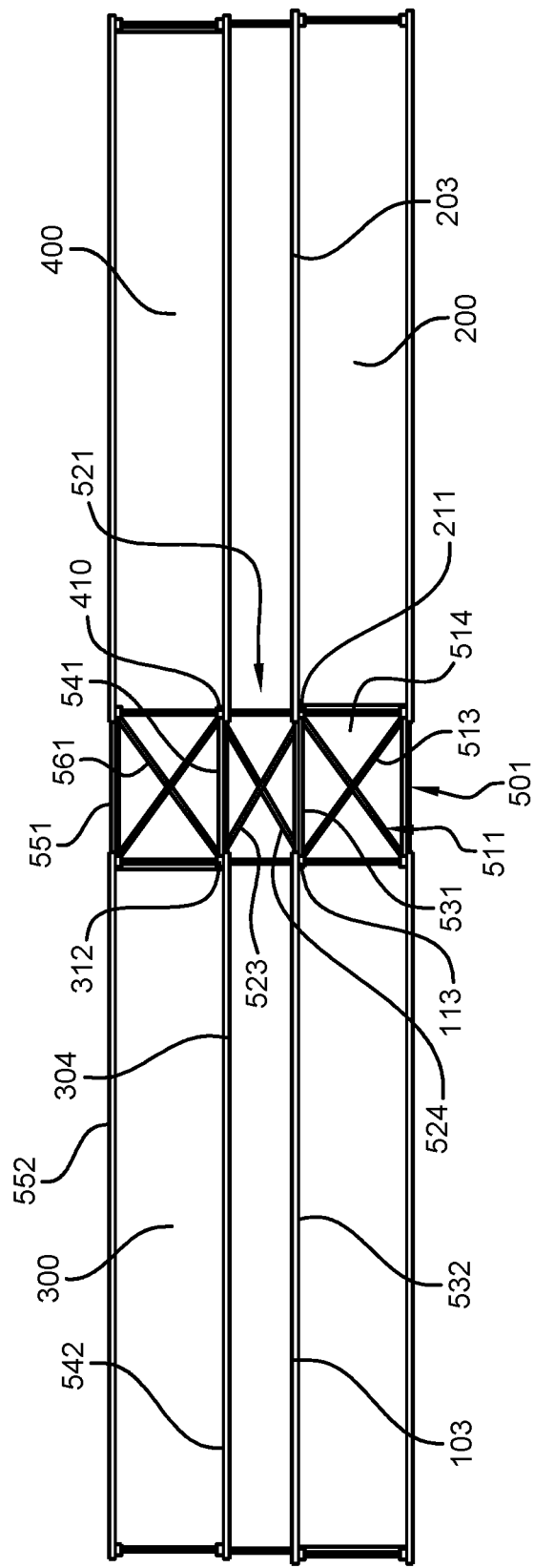
FIG. 6 is a schematic top of the storage unit of FIG. 1.

As can be seen in FIG. 6, a second mesh 511 extends in a second horizontal plane 512. The first upper face 102 and the second upper face 202 also lie in the second plane 512. The second mesh 511 is composed of steel angle bars 513, bolted to make triangulated systems 514 which connect the upper edges of the first rack 100 and of the second rack 200.

A third mesh 521 extends in the second horizontal plane 512 which also comprises, here, the third upper face 302 and the fourth upper face 402. The third mesh 521 is composed of steel angle bars 523, bolted to make triangulated systems 524 which connect the first left front upright 113, the second left rear upright 211, the third right front upright 312 and the fourth right rear upright 410.

The first mesh 501, the second mesh 511 and the third mesh 521 belong to a horizontal bracing structure 500.

The horizontal bracing structure 500 can also comprise a fourth mesh 531 extending in a fourth vertical plane 532 which also comprises, here, the first left longitudinal face 103 and the second left longitudinal face 203. The fourth mesh 531 could be identical to the first mesh 501.

The horizontal bracing structure 500 can also comprise a fifth mesh 541 extending in a fifth vertical plane 542 which also comprises, here, the third right longitudinal face 304 and the fourth right longitudinal face 404. The fourth mesh 531 could be identical to the first mesh 501.

The horizontal bracing structure 500 can also comprise a sixth mesh 551 extending in a sixth vertical plane 552 which also comprises, here, the third left longitudinal face 303 and the fourth left longitudinal face 403. The sixth mesh 551 could be identical to the first mesh 501.

The horizontal bracing structure 500 can also comprise a seventh mesh 561 extending in a sixth horizontal plane 552 which also comprises, here, the third upper face 302 and the fourth upper face 402. The seventh mesh 561 connects the upper edges of the third rack 300 and of the fourth rack 400. Homologously, other horizontal meshes similar to the second mesh 511, to the third mesh 521 or to the fourth mesh 531 can extend between two or more racks from among the first rack 100, the second rack 200, the third rack 300 and/or the fourth rack 400.

The horizontal bracing structure 500, by stopping at a distance $H_{pas}$ from the floor 2, enables the circulation of the first carriage 70 and of the second carriage 80 in the central avenue 9 when they support no container or one of the lower or upper containers. When the first carriage and/or the second carriage support an intermediate container, the unit 91 drives them such that they do not circulate in the central avenue 9.

In operation, when it is sought to remove an item stored in one of the storage compartments of the order preparation system 90, for example an item stored in the first left front lower container 151, this removal request is processed by the unit 91. The unit 91 drives the first carriage 70 to bring it into the rear central circulation span 3, such that the first gearwheel 73.1, the second gearwheel 73.2, the third gearwheel 73.3 and the fourth gearwheel 73.4 respectively face the first left front upright 113, the first left intermediate upright 115, the third right front upright 312 and the third right intermediate upright 314.

The driving unit 77 thus drives the deployment of the first arm 74.1. As can be seen in FIG. 24, the first gearwheel 73.1 substantially faces the first front chain 170.3. During the deployment of the first arm 74.1, the first camera 78.10 transmits to the driving unit 77 a first image of the relative position of the first gearwheel 73.1 and of the first chain 170.3. Based on an analysis of this image, the driving unit 77 can adjust the relative positioning of the first carriage 70 and of the first left front upright 113 by controlling the wheels 72.1 to 72.4. Once the relative positioning of the first chain 170.3 and of the first gearwheel 73.1 is done, the driving unit 77 controls the deployment of the first arm 74.1 until meshing of the first gearwheel 73.1 with the first chain 170.3. Homologously, the driving unit 77 deploys the second arm 74.2 then the third arm 74.3 and the fourth arm 74.4, while adjusting the position of the first carriage 70 so as to bring the second gearwheel 73.2, the third gearwheel 73.3 and the fourth gearwheel 73.4 meshing respectively with the first left intermediate chain 170.5, the third right intermediate chain 370.4 and the third right front chain 370.2. The movement of the first carriage 70 to adjust the relative position of the gearwheels 73.1 to 73.4 with the chains 170.3, 170.5, 370.2 and 370.4 is in particular facilitated by the flexibility of the arms 74.1 to 74.4 in the main direction 75 and the deployments of the arms that are simultaneous or successive.

A rotation of the gearwheels 73.1 to 73.4 in a first rotational direction allows the first carriage 70 to climb relative to the first rack 100 and to the third rack 300 in a vertical direction until located at a level substantially lower than that of the first pair of front lower slides 121. The plate 78 is deployed to extend under the bottom of the first left front container 151. An additional rotation of the gearwheels 73.1 to 73.4 allows the lug 78 to engage with a homologous orifice 151.1 of the bottom of the container 151. The unit 91 then controls a retraction of the plate 78 then a rotation of the gearwheels 73.1 to 73.4 in a second rotational direction opposite the first rotational direction to bring the first carriage 70 in contact with the floor 2.

Once the wheels 72.1 to 72.4 of the first carriage 70 are in contact with the floor 2, the driving unit 77 controls a retraction of the telescopic arms 74.1 to 74.4 and drives the first carriage 70 until the removal area 93 and the ramp 94. After an operator has removed the item in the first left front container 151 and validated this removal, the unit 91 controls the first carriage 70 such that it replaces the first left front container 151 in the first front lower storage compartment 140.

Figure 18:
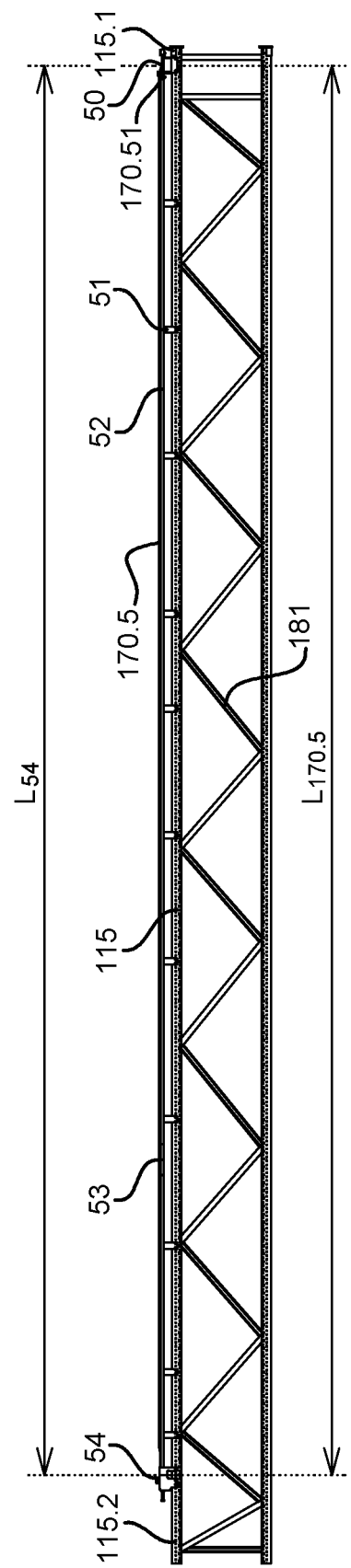
FIG. 18 is a schematic view of a second upright treated according to the method of the invention.
Figure 19:
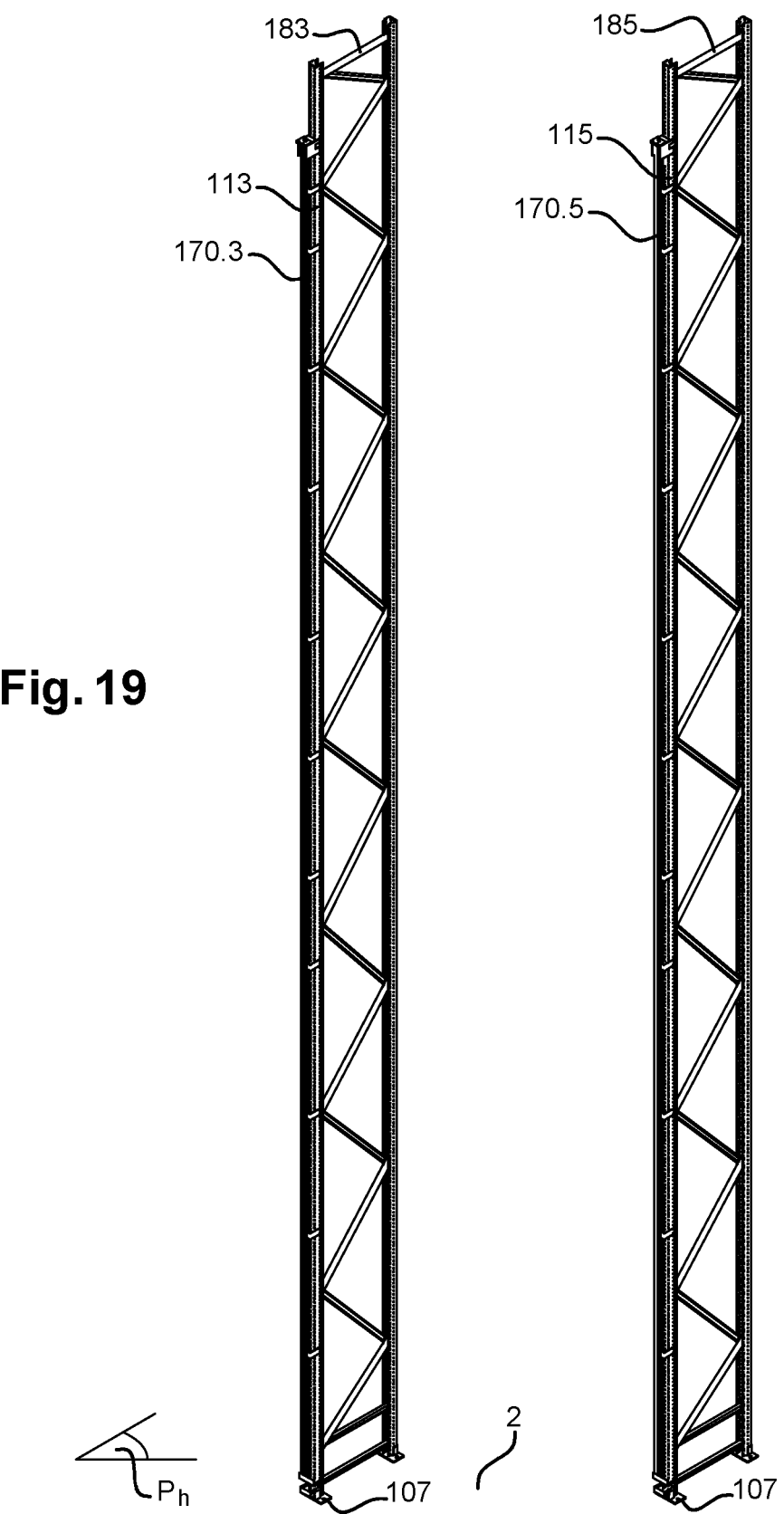
FIG. 19 is a schematic, perspective view of a tenth step of a method for securing a chain according to the invention.
Figure 20:
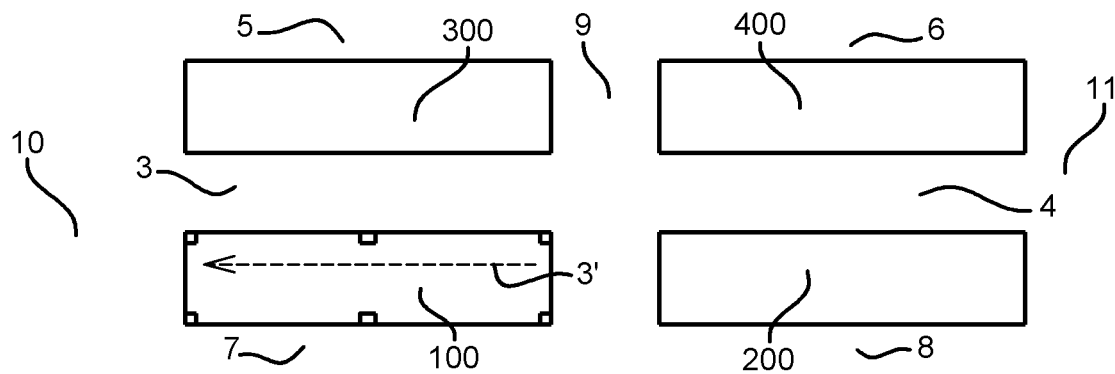
FIG. 20 is a schematic top view of the storage unit of FIG. 1.

When the first carriage 70 and the second carriage 80 are used simultaneously, it can occur that the first carriage 70 and the second carriage 80 must circulate in one same span—here, for example the rear central span 3 to have access to containers or to join the removal area 93. The alignment of the first front free passage volume 190 and the first rear free passage volume 191 allows to create a first additional rear central circulation span 3' which thus extends under the first front lower compartment 140 and the first rear lower compartment 144. The first additional rear central span 3' enables a circulation of the first carriage 70 and/or of the second carriage 80 from the first front transverse face 105 of the first rack 100 to the first rear transverse face 106 of the first rack 100. The circulation of the first carriage 70 and/or of the second carriage 80 can be done, including when these transport a container similar to the first right lower front container 150 or to the first right front upper container 154. During the transport of a container similar to the first right front intermediate container 152 of greater height, the unit 91 controls the first carriage 70 or the second carriage 80 thus loaded such that it does not use the first additional rear span 3' (FIG. 18).

Of course, the second rack 200, the third rack 300 and the fourth rack 400 themselves also comprise front and rear free passage volumes to create other additional circulation spans.

The elements identical or similar to those described above will have a number reference identical to that in the following description of a second embodiment of the invention.

Figure 23:
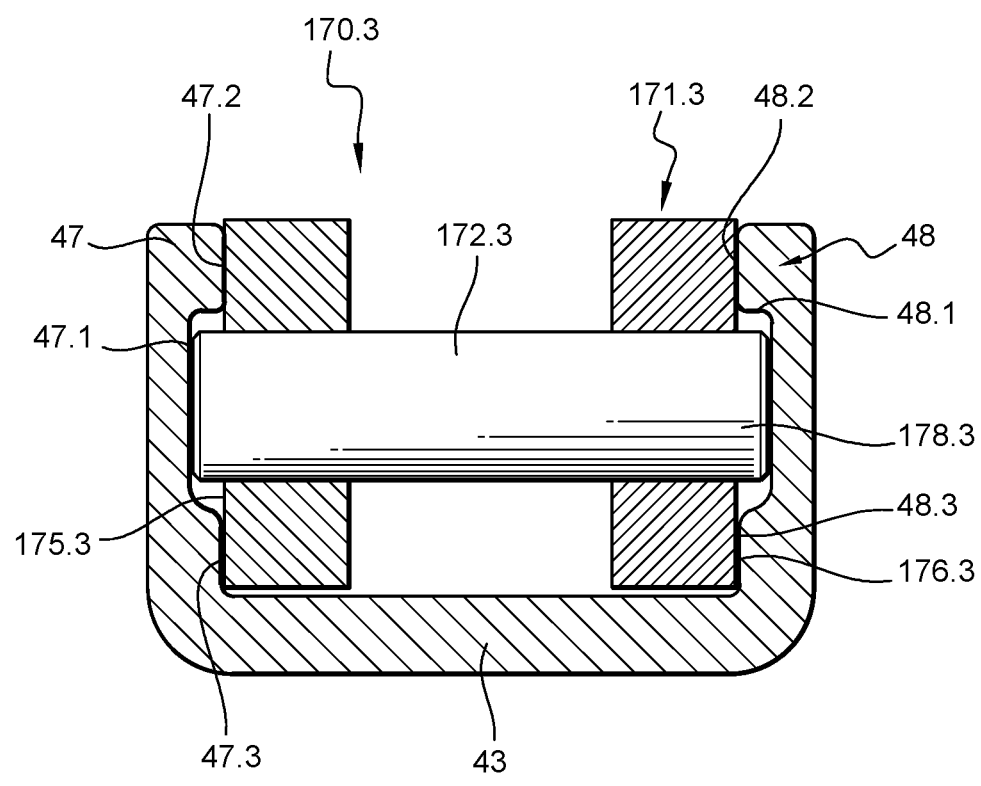
FIG. 23 is a schematic, cross-sectional view of the chain of FIG. 13.

According to a second embodiment, the damper profile 43 has a U-shaped cross-section. More specifically, and as can be seen in FIG. 23, the first damper element 43 comprises a first left wing 47 and a first right wing 48. The first left wing 47 comprises a first left inner groove 47.1 which separates a first left upper land 47.2 and a first left lower land 47.3. Homologously, the first right wing 48 comprises a first right inner groove 48.1 which separates a first right upper land 48.2 and a first right lower land 48.3.

Steps 1 to 4 of the setting method according to the second embodiment of the invention are identical to the four first steps of the setting method according to the first embodiment.

Figure 21:
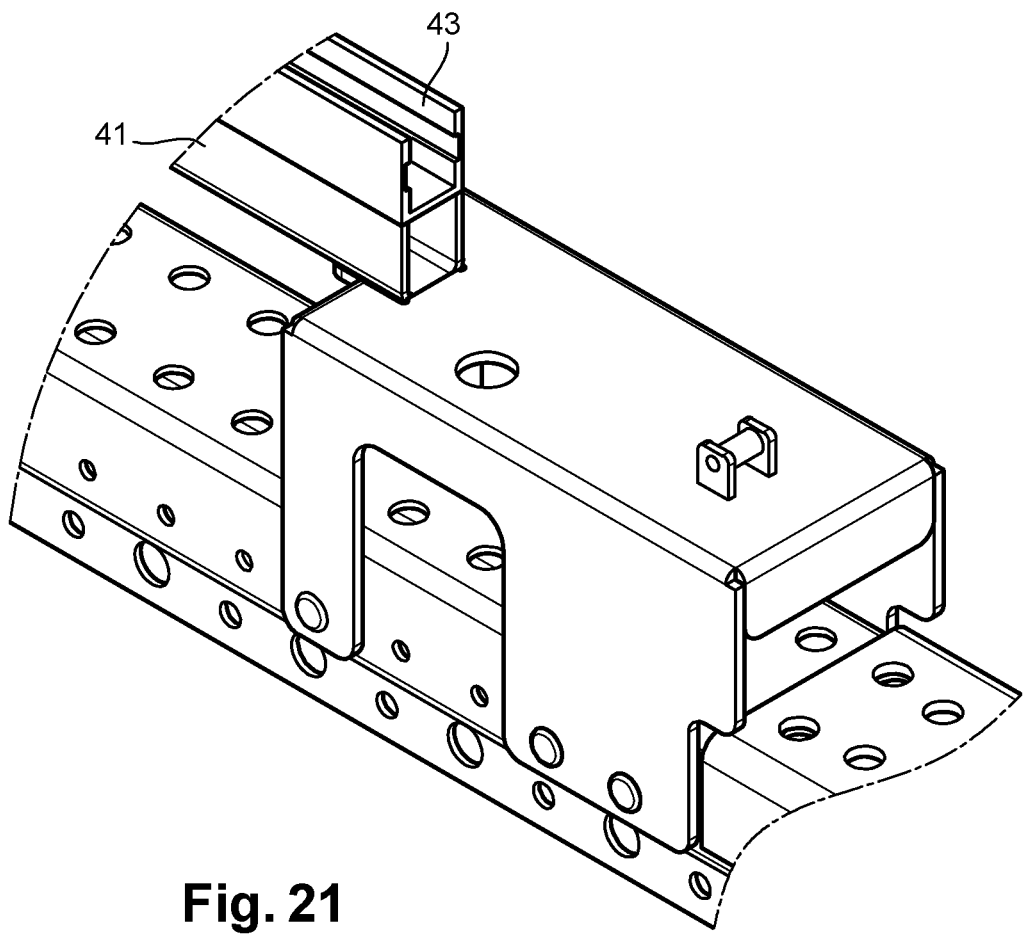
FIG. 21 is a schematic, perspective view of a fifth step of a method for securing a chain according to a second embodiment of the invention.

According to a fifth step represented in FIG. 21, the first nitrile damper element 43 is deposited on the profile 41. The outer dimensions of the first damper element 43 make it rest on the upper ends of the first right wing 41.2 and of the first left wing 41.3 of the profile 41.

Figure 22:
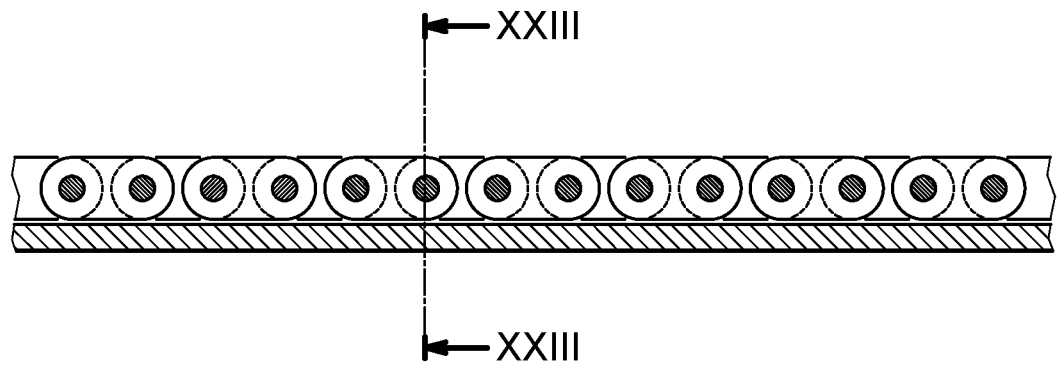
FIG. 22 is a detailed schematic side view of a chain in its damper element.

According to a sixth step, the first lower end 170.31 of the first left front chain 170.3 is attached to the first pair of flanges 22 using a first pin 44 and the first left front chain is positioned in the first damper element 43 (FIGS. 21 to 23). As can be seen in FIG. 23, the first left upper land 47.2 and the first left lower land 47.3 are in contact with the first left outer side 175.3 of the first link 171.3 and the first left end 177.3 of the first axis 172.3 is in contact with the bottom of the first left inner groove 47.1. Identically, the first right upper land 48.2 and the first right lower land 48.3 are in contact with the first right outer side 176.3 of the first link 171.3 and the first right end 178.3 of the first axis 172.3 is in contact with the bottom of the first right inner groove 48.1.

According to a seventh step, the first upper end 170.32 of the first left front chain 170.3 is connected to the first chain tensioner 46.

According to an eighth step, the nut 46.5 is acted on to adjust a distance $L_{46}$ separating the first upper end 170.32 of the first left front chain 170.3 of the transverse wall 42.2 and to bring it to a predetermined value $d_{46}$, here equal to 12 millimetres. A locknut 46/8 locks the position of the threaded rod 46.1 relative to the first left front upper connector 42 and thus immobilises the position of the first upper end 170.32 of the first left front chain 170.3 relative to the first upright 113. By adjusting the distance $L_{46}$, the distance $L_{170.3}$ which separates the first lower end 170.32 of the first left front chain 170.3 is acted on.

According to a ninth step, the unit constituted of the first damper element 43 which contains the first left front chain 170.3 is mounted inside the profile 41. This mounting is done by forcing the first damper element 43 into the profile 41 due to the relative dimensions of the first damper element 43 and of the profile 41. The outer dimensions of the first damper element 43 and the inner dimensions of the profile 41 are chosen to make an interference fit. Thus, the first left wing 47 of the first damper element 43 exerts a normal force on the first left outer side 175.3 via the first left upper land 47.2 and the first left lower land 47.3. The first left wing 47 of the first damper element 43 also exerts a normal force on the first left end 177.3 of the first axis 172.3 via the bottom of the first left groove 47.1. Identically, the first right wing 48 of the first damper element 43 exerts a normal force on the first right outer side 178.3 via the first right upper land 48.2 and the first right lower land 48.3. The first right wing 48 of the first damper element 43 also exerts a normal force on the first right end 178.3 of the first axis 172.3 3 via the bottom of the first right groove 48.1.

The tenth step of the second embodiment of the securing method of the invention corresponds to the ninth step represented in FIG. 15 of the first embodiment of the method according to the invention and a first left front reinforcing mesh 183 is mounted on the first left front upright 113.

The first left intermediate upright 115 is treated identically and comprises a second U-shaped damper element 53 wherein the first left intermediate chain 170.5 is mounted close.

The mounting, the securing and the final setting of the first left front upright 113 and of the first left intermediate upright 115 is done according to the steps described in the first embodiment above.

Thus, a storage rack element is obtained, wherein the first left front upright 113 comprises a first damper element 43 which exerts first friction forces on the first left front chain 170.3 which tends to oppose to an extension of the first left front chain 170.3 in a direction substantially parallel to the climbing direction.

The tensioning of the first left front chain 170.3 in the first damper element 43 before the mounting of the first damper element 43 in the profile 41 allows to have a regularly distributed chain tension (no jamming of certain links 171.3 of the first left front chain 170.3 in the first damper element 43 under the effect of the profile 41) therefore avoids a relaxation of the first left front chain 170.3.

Identically, the first upright comprises a second damper element 53 identical to the first damper element 43 which exerts second friction forces on the first left intermediate chain 170.5 which tends to oppose to an extension of the first left intermediate chain 170.5 in a direction substantially parallel to the climbing direction.

The first damper element 43 and the second damper element 53 ensure, in addition to the damping of vibrations of the chain and of the reduction of noise, an immobilisation respectively of the first left front chain 170.3 and of the first left intermediate chain 170.5. Thus, the extension and/or the relaxation of the chains under the urges of the first carriage 70 and of the second carriage 80 is/are reduced. Thus, the occurrences of setting of the tensions of the chains and therefore the immobilisation time of the storage unit are reduced.

Of course, the invention is not limited to the embodiment described, but comprises any variant entering into the field of the invention such as defined by the claims.

In particular,

- although here the depth of the first rack is equal to 950 millimetres corresponding to two containers of 450 millimetres of depth separated by a clearance of 5 millimetres, the invention also applies to other depth values of upper or lower racks at 950 millimetres to receive one single container in depth or two separate containers of a reduced or lower clearance;
- although here the first and the second basic distance are equal to 495 millimetres, the invention also applies to other basic distance values, greater than the minimum distance which corresponds to the lowest height of the storage compartments, to which the transport height which separates the floor from a carriage plate when it rests on the floor, has preferably been added;
- although here the first lower distance which separates the lower slides from the intermediate slides is equal to 225 millimetres to reserve 5 millimetres of clearance to the container, the invention also applies to other lower first distance values which could include a clearance greater or less than 5 millimetres. The same applies for the first intermediate and upper distances;
- although here the first upper distance which separates the intermediate slides from the upper slides is equal to 325 millimetres, the invention also applies to other upper first distance values to, for example, obtain a rack wherein all the storage compartments are of identical dimensions;
- although here the first rack comprises a first intermediate upright separating two rack elements each comprising a column of storage compartments, the invention also applies to other rack configurations, like for example, a rack comprising a different number of intermediate uprights, like for example, no intermediate upright, two intermediate uprights or more;
- although here the first minimum distance is equal to the lower distance—here 225 millimetres, the invention also applies to other values of the first minimum distance and which corresponds to the lowest of the heights of the storage compartments, like for example, the height of another compartment;
- although here the uprights of one same longitudinal face are equidistant, the invention also applies to uprights separated by different distances;
- although here the uprights of the rack elements are attached to the floor using anchoring plates bolted on anchoring rods, the invention also applies to other means for securing a rack element to a bearing surface, like for example, anchoring sticks, a connection welded to an anchoring plate, one single anchoring on one single upright;

although here the slides are made in the form of metal angle bars, the invention also applies to other types of slides, like for example, square or cylindrical profiles made of PTFE or other synthetic material;

although here the slides are bolted to the uprights, the invention also applies to other means for connecting the slides to the upright, like for example, screwing, welding or snap-fitting;

although here the first rack comprises two rack elements to define two columns of three storage compartments, the invention also applies to other rack configurations, like for example, a rack comprising one single rack element or more than two to define a different number of columns which could contain a different number of storage compartments;

although here the stacking direction is vertical, the invention also applies to other orientations for the stacking direction, like for example, a direction at 45 degrees with respect to the vertical or any other;

although here the storage compartments contain containers of two different sizes, the invention also applies to compartments receiving other storage elements, like for example, plates, pallets or raw products;

although here the first front passage section has a second dimension in a transverse direction connecting the first longitudinal faces that is substantially equal to the first depth p100, the invention also applies to other values for the second dimension in a transverse direction, preferably a second dimension in a transverse direction substantially equal to half the length of a pair of slides;

although here the uprights are provided with climbing chains with 300 links, the invention also applies to other types of climbing elements, like for example, toothed belts, toothed bars, double-linked chains or Galle-type chains, threaded or twisted cables. The climbing elements can also be two different types, like for example, a first chain with 300 links and a second chain with 150 links;

although here the first left front upright is a perforated U-shape, the invention also applies to other types of upright, like for example, square tubes, cylindrical tubes with IBE, IPN or HEA profiles, perforated or not;

although here the lower guiding device is bolted on the upright by means of bolts engaged in attachment tabs, the invention also applies to a guiding device provided with other means for attaching to an upright, like for example, screwing, welding, gluing or snap-fitting;

although here the lower guiding device comprises an orifice for receiving a lower end of a chain and a connecting pin, the invention also applies to a lower guiding device with no means for connecting to a chain end, to a lower chain connector with no guiding means and to a guiding device provided with other types of means for connecting a chain end, like for example, a hook or a screw engaged in a link;

although here the upper connector is bolted on the upright, the invention also applies to an upper connector provided with other means for attaching to an upright, like for example, screwing, welding, gluing or snap-fitting;

although the steps of the methods for securing the uprights to one another have been described one after the other, the invention also applies to a method wherein certain steps are carried out simultaneously or in a different order;

although here jumpers are linked to the uprights to receive a support profile, the invention also applies to other types of support of a chain support profile, like for example, tubular supports, vibration-absorbing supports, or also any support;

although here the first profile is U-shaped, the invention also applies to other types of chain support profile, like for example, a C-shaped profile;

although here a flat nitrile profile is placed between the chain and the support profile, the invention also applies to other types of damper element, like for example, a neoprene, foam EPDM land, or a plurality of elastomer pads. In the same way, other cross-sections are possible for the damper element, like for example a U-shaped, L-shaped cross-section, a (flat) rectangular cross-section or other;

although here the distance L46 is adjusted to a value equal to 22 millimetres, the invention also applies to other third predetermined values of the fourth distance separating the second upper connector of the second upper end of the second climbing element, like for example more than 22 millimetres or less;

although here the distance $L_{170.3}$ is adjusted to a value equal to 2500 millimetres, the invention also applies to other values for the first predetermined distance which separates the first lower end and the first upper end of the first chain;

although here the uprights are positioned vertically, parallel to the vertical climbing direction, the invention also applies to other orientations of the climbing direction, like for example, a climbing direction d at 45 degrees with respect to the vertical or any other, the adjustment plane of the first and second connectors thus needing to be orthogonal to the climbing direction;

although here the lower guiding device comprises a lug, the invention also applies to a lower guiding device with no means for connecting a profile for supporting the climbing element or another type of profile connection, like for example, a land or a nipple;

although here the first carriage comprises driving wheels, the invention also applies to other means for moving the carriage on the floor, like for example tracks, an air cushion, a hook for engagement in a towpath;

although here the first carriage comprises gearwheels, the invention also applies to any other motorised climbing means which could engage with the uprights to allow the carriage to be raised along these uprights, like for example, magnetic tracks or a worm screw;

although here the first mesh extends in a first plane comprising the first right longitudinal face and the second right longitudinal face, the invention also applies to other installations of the first horizontal bracing structure element, like for example, a first mesh extending in a plane comprising only one of the first or second longitudinal face or none of the two, the mesh could extend in a plane having any orientation with respect to a vertical plane;

although here the second mesh extends in a second plane comprising the first upper face and the second upper face, the invention also applies to other installations of the second horizontal bracing structure element, like for example, a second mesh extending in a plane comprising only one of the first or second upper face or none of the two, the mesh could extend in a plane having any orientation with respect to a horizontal plane;

although here the third mesh extends in the second horizontal plane, the invention also applies to other installations of the third horizontal bracing structure element, like for example, a third mesh extending in a plane containing none of the upper faces of the racks, the mesh could extend in a plane having any orientation with respect to a horizontal plane;

although here the mesh is composed of bolted steel angle bars to form triangulated systems, the invention also applies to other types of bracing, like for example, tube-shaped meshes, bolted or welded, the elements composing the mesh could be made of other ferrous materials, or materials which are not even synthetic. The mesh can also comprise a rigid wall, cables, etc.;

although here the plate comprises a lug for connecting to a container, the invention also applies to other means for connecting to a container, like for example, several lugs, a hook or a magnet;

although here the first mesh is mounted after the tensioning of the first chain, the implementation of the first mesh is done preferably before the tensioning of the first chain;

although here the positioning of the robot relative to the chains is done using cameras, the invention also applies to other types of sensors which could assist a positioning operation, like for example, an ultrasound, infrared, lidar or radar sensor;

although here the first damper element exerts first friction forces on the two outer sides of the links and on the ends of the link connecting axes, the invention also applies to other arrangements of the first damper element, like for example, a damper element only exerting first friction forces on one single outer side of the link or on the ends of the axes. The same applies for the second damper element;

although here the first upright comprises a first profile wherein the first damper element is mounted, the invention also applies to a first single damper element which does not require any profile to be held to the first upright, like for example, a first reinforced elastomer element, or provided with reinforcements or inserts.

The invention claimed is:

1. A method for securing a first upright and a second upright parallel to one another and provided respectively with a first climbing element and a second climbing element, the method comprising the following steps;

the first upright being in a first mounting position:
a) attaching a first lower connector to a first lower portion of the first upright;
b) attaching a first upper connector to a first upper portion of the first upright;
c) attaching a first lower end of the first climbing element to the first lower connector and a first upper end of the first climbing element to the first upper connector;
d) adjusting a first distance separating the first lower end and the first upper end of the first climbing element to bring the first distance to a first predetermined value;
e) immobilising the position of the first lower end and the position of the first upper end of the first climbing element relative to the first upright;

the second upright being in a second mounting position:
g) attaching a second lower connector to a second lower portion of the second upright;
h) attaching a second upper connector to a second upper portion of the second upright;
i) attaching a second lower end of the second climbing element to the second lower connector and a second upper end of the second climbing element to the second upper connector;
j) adjusting a second distance separating the second lower end and the second upper end of the second climbing element to bring the second distance to the first predetermined value;
k) immobilising the position of the second lower end and the position of the second upper end of the second climbing element relative to the second upright;
l) Positioning the first upright and the second upright such that the first climbing element and the second climbing element extend parallel to a climbing direction;
m) adjusting the position of the first upright and the position of the second upright such that the first lower end of the first climbing element and the second lower end of the second climbing element lie in a plane substantially orthogonal to a climbing direction, step i) of attaching a second lower end of the second climbing element to the second lower connector and a second upper end of the second climbing element to the second upper connector comprises a step i') of attaching a second profile for supporting the second climbing element to the second upright; and a step i") comprising the placing of a second damper element between the second profile and the second climbing element.

2. The method according to claim 1, wherein the second damper element is arranged to exert second friction forces on the second climbing element tending to oppose to an extension of the second climbing element in a direction substantially parallel to the climbing direction.

3. The method according to claim 1, wherein the first climbing element comprises a first chain and the second climbing element comprises a second chain.

4. The method according to claim 1, wherein the first mounting position and/or the second mounting position is substantially horizontal and/or the climbing direction is substantially vertical.

5. The method according to claim 1, wherein step b) of attaching a first upper connector to a first upper portion of the first upright comprises a step b') of positioning the first upper connector at a third predetermined distance from the first lower connector and step d) of adjusting a first distance separating the first lower end and the first upper end of the first climbing element to bring the first distance to a first predetermined value comprises a step d') of adjusting a fourth distance separating the first upper connector of the first upper end of the first climbing element to bring the fourth distance to a third predetermined value.

6. The method according to claim 1, wherein step h) of attaching a second upper connector to a second upper portion of the second upright (115) comprises a step h') of positioning the second upper connector at a second predetermined distance and step j) of adjusting a second distance separating the second lower end and the second upper end of the second climbing element to bring the second distance to the first predetermined value comprises a step j') of adjusting a fifth distance separating the second upper connector of the second upper end of the second climbing element to bring the fifth distance to the third predetermined value.

7. The method according to claim 1, wherein step c) of attaching a first lower end of the first climbing element to the first lower connector and a first upper end of the first climbing element to the first upper connector comprises a step c') of attaching a first profile for supporting the first climbing element to the first upright.

8. The method according to claim 7, wherein step c) of attaching a first lower end of the first climbing element to the first lower connector and a first upper end of the first climbing element to the first upper connector also comprises a step c") which follows step c') of attaching a first profile for supporting the first climbing element on the first upright, step c") comprising the placing of a first damper element between the first support profile and the first climbing element.

9. The method according to claim 8, wherein the first damper element is arranged to exert first friction forces on the first climbing element tending to oppose to an extension of the first climbing element in a direction substantially parallel to the climbing direction.

10. The method according to claim 7, comprising a step b') prior to step c) of attaching a first lower end of the first climbing element to the first lower connector and a first upper end of the first climbing element to the first upper connector, step b') comprising the placing of supports for the first profile intended to keep the first profile at a non-zero distance from the first upright.

11. The method according to claim 9, comprising a step h') prior to step i) of attaching a second lower end of the second climbing element to the second lower connector and a second upper end of the second climbing element to the second upper connector, step h') comprising the placing of supports for the second profile intended to keep the second profile at a non-zero distance from the second upright.

12. The method according to claim 1, comprising an additional step k') prior step 1) of positioning the first upright and the second upright such that the first climbing element and the second climbing element extend parallel to a climbing direction, step k') comprising mounting a first reinforcing mesh on the first upright and/or mounting a second reinforcing mesh on the second upright.

13. A storage rack element comprising at least one first upright and one second upright parallel to one another and provided respectively with a first climbing element and a second climbing element, wherein a first lower end of the first climbing element is attached to a first lower end of the first upright and a first upper end of the first climbing element is attached to a first upper end of the first upright;

a second lower end of the second climbing element is attached to a second lower end of the second upright and a second upper end of the second climbing element is attached to a second upper end of the second upright; wherein the position of the first upright and the position of the second upright are arranged such that the first lower end of the first climbing element and the first lower end of the second climbing element lie in a plane substantially orthogonal to a climbing direction, the second upright comprising a second profile for supporting the second climbing element, a second damper element extending between the second support profile and the second climbing element.

14. The storage rack element according to claim 13, wherein the first damper element has a U-shaped cross-section.

15. The storage rack element according to claim 13, wherein the first climbing element comprises a first chain and the second climbing element comprises a second chain.

16. The storage rack element according to claim 15, wherein the first chain comprising first links connected by first axes, the first damper element is arranged to exert the first friction forces on first sides of the first links and on first ends of the first axes.

17. A storage unit comprising a plurality of storage rack elements according to claim 13, the plurality of storage rack elements delimiting at least one first circulation span in a main circulation direction.

* * * * *